United States Patent [19]

Newberry

[11] Patent Number: 5,502,443
[45] Date of Patent: Mar. 26, 1996

[54] TRANSPONDER FOR INTERACTIVE DATA EXCHANGE BETWEEN INDIVIDUALLY USER-CONTROLLED COMPUTER-STEERED SYSTEMS

[76] Inventor: Robert S. Newberry, 3209 Beverly Dr., Huntsville, Ala. 35801

[21] Appl. No.: 265,738

[22] Filed: Jun. 27, 1994

[51] Int. Cl.[6] .................................................. H04Q 1/00
[52] U.S. Cl. ............................ 340/825; 379/99; 379/90; 273/DIG. 28; 340/825.21
[58] Field of Search ......................... 340/825, 825.21, 340/323 R; 379/90, 99; 273/148 B, 856, 237, DIG. 28

[56] References Cited

U.S. PATENT DOCUMENTS

| | | | |
|---|---|---|---|
| 3,654,392 | 4/1972 | Beinhocker | 340/323 R |
| 4,126,851 | 11/1978 | Okor | 273/DIG. 28 |
| 4,200,867 | 4/1980 | Hill | 273/DIG. 28 |
| 4,339,798 | 7/1982 | Hedges | 340/323 R |
| 4,372,558 | 2/1983 | Shimamoto | 379/90 |
| 4,389,048 | 6/1983 | Burgess | 273/85 G |
| 4,570,930 | 2/1986 | Matheson | 273/DIG. 28 |
| 4,572,509 | 2/1986 | Sitrick | 273/85 |
| 4,652,998 | 3/1987 | Koza et al. | 364/412 |
| 5,048,831 | 9/1991 | Sides | 273/85 |
| 5,083,800 | 2/1992 | Lockton | 273/439 |
| 5,114,155 | 5/1992 | Tillery et al. | 273/371 |
| 5,396,225 | 3/1995 | Okada | 340/825.21 |

*Primary Examiner*—Brian Zimmerman
*Attorney, Agent, or Firm*—John C. Garvin, Jr.; Stephen K. Arnold

[57] ABSTRACT

A transponder for use with a pair of dual-controllable systems remote from each other, such as a two-player computer operated game, allows the players and their associate game units to interactively play against each other from remote locations.

The transponder receives status words from an associated controller, retains a copy in temporary storage, and formulates command words for a similarly configured transponder associated with the remote unit. The command word includes a status portion comprising a replica of the stored word, an error detection code, and a confirmation code. The error detection code is used to detect transmission errors in received words, and the confirmation code is used to indicate error-free reception of words from the remote unit. A command word is sent responsively to receipt of each received command word. If the error code of the received word indicates error-free reception of the received word and a confirmation is also received, the status portion of the received word and the stored word ar presented to a pair of output ports for transfer to the associated game console. The baud rate of the communication system linking the two transponders allows a word-pair to be generated in less that one-thirtieth of a second, allowing asynchronous operation.

15 Claims, 20 Drawing Sheets

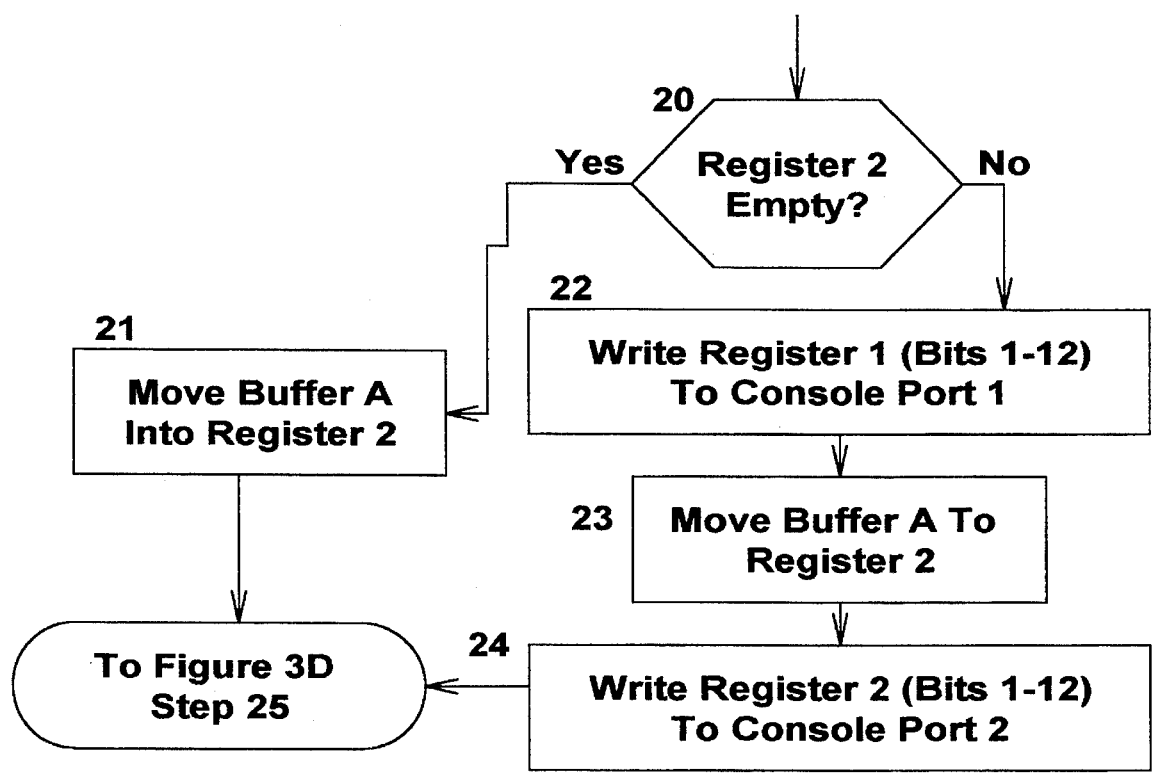

Enable Confirmation Flag
Register 1: 1 Bit 13

26

Increment MOD 3 Counter
Register 1: Bits 14,15

27

Enable Confirmation LED

To Figure 3A
Step 3

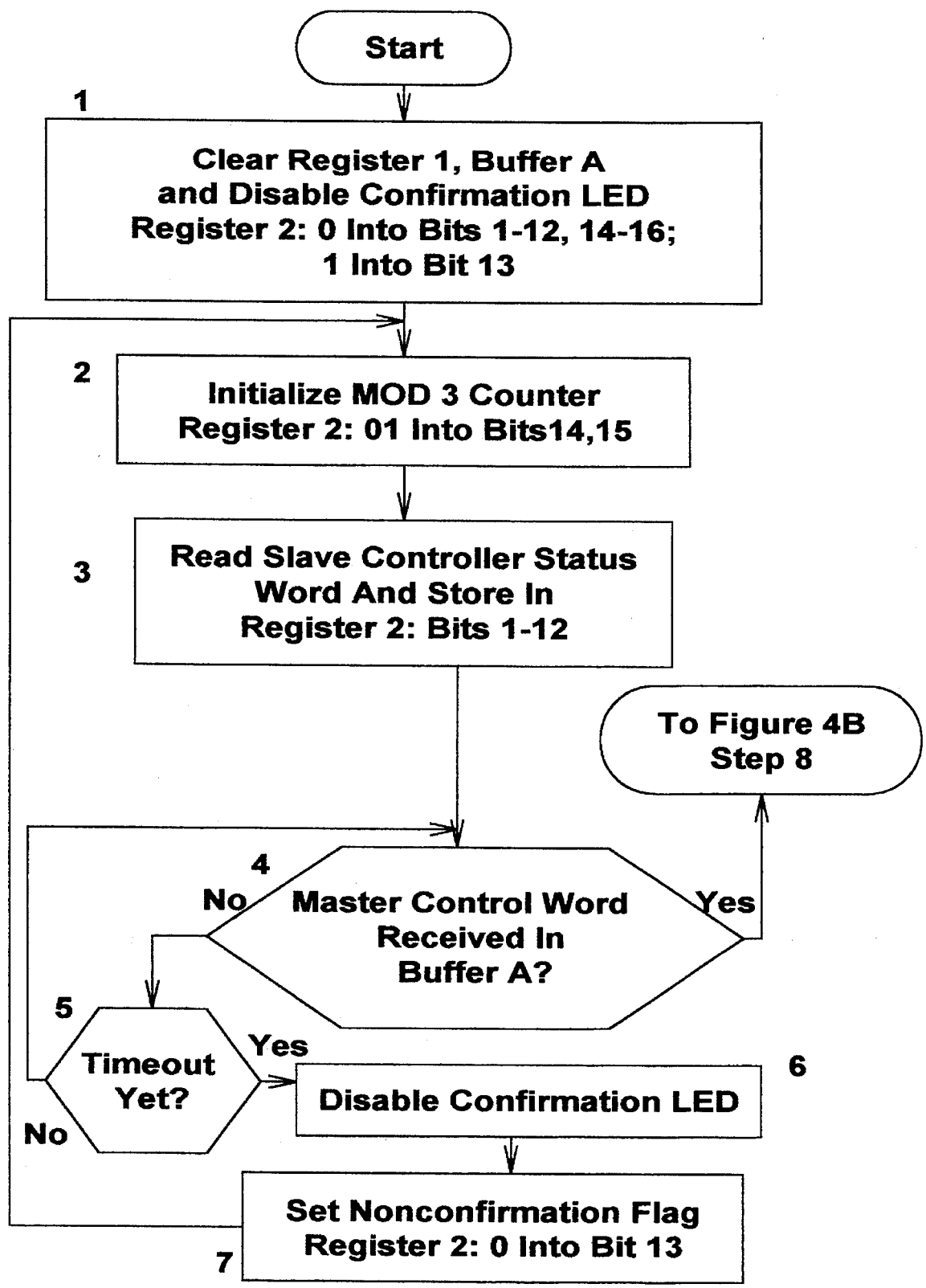

FIGURE 4D

24
Enable Confirmation Flag
Register 2: 1 Bit 13

25
Increment MOD 3 Counter
Register 2: Bits 14,15

26
Enable Confirmation LED

27
Send Out Slave Command Word From Register 2

To Figure 4A Step 3

FIGURE LAYOUT

| FIG. 7A | FIG. 7B | FIG. 7C |
|---|---|---|
| | FIG. 7E | FIG. 7D |

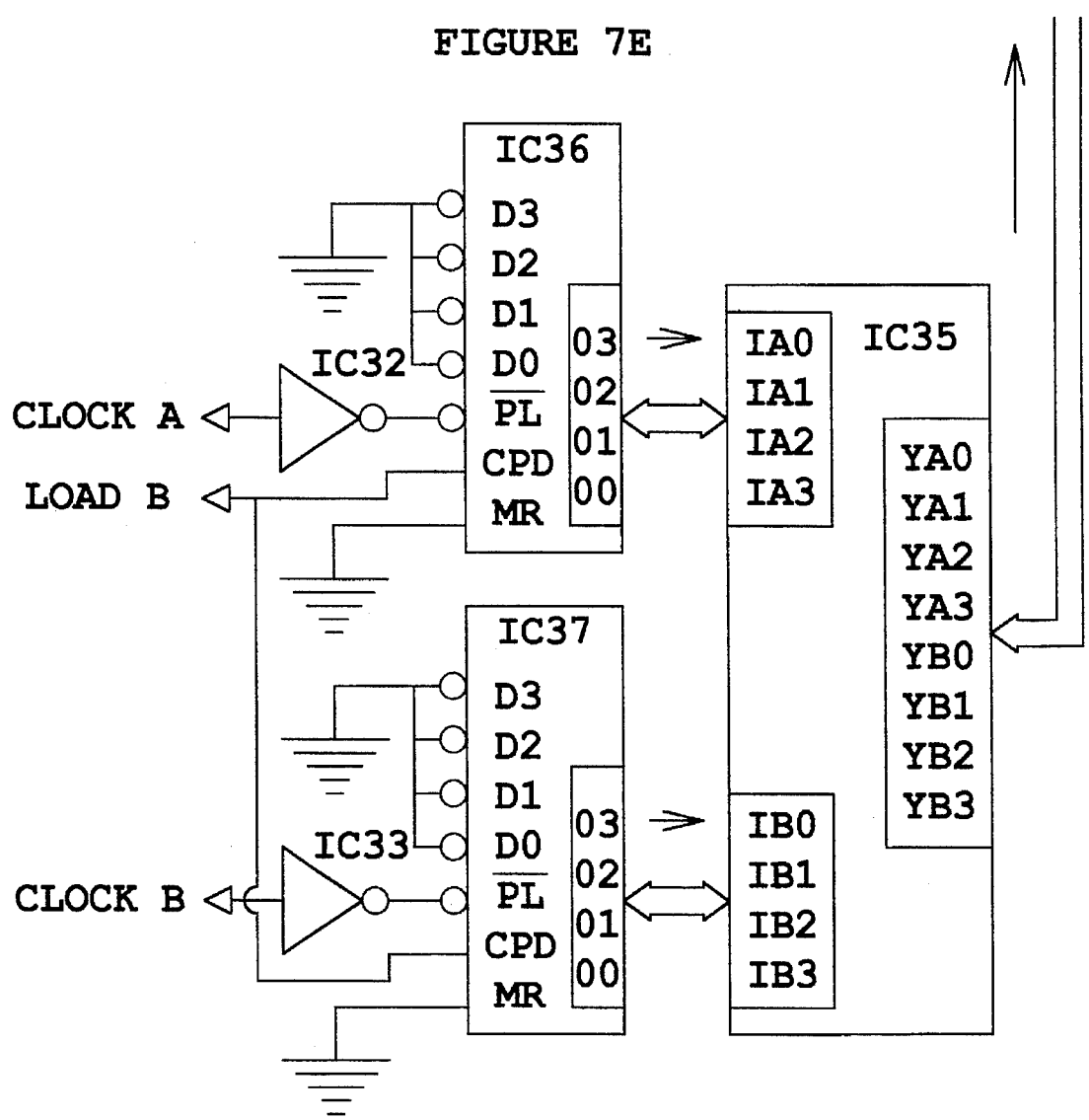
FIGURE 7E
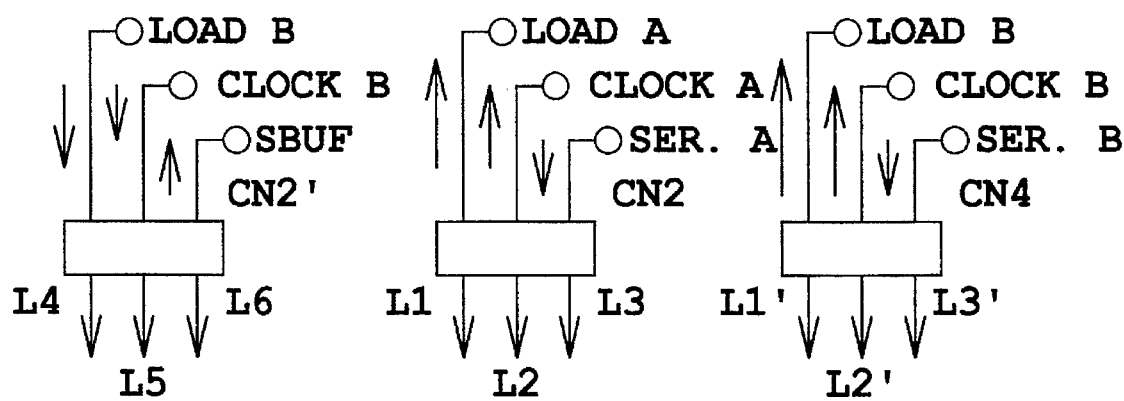

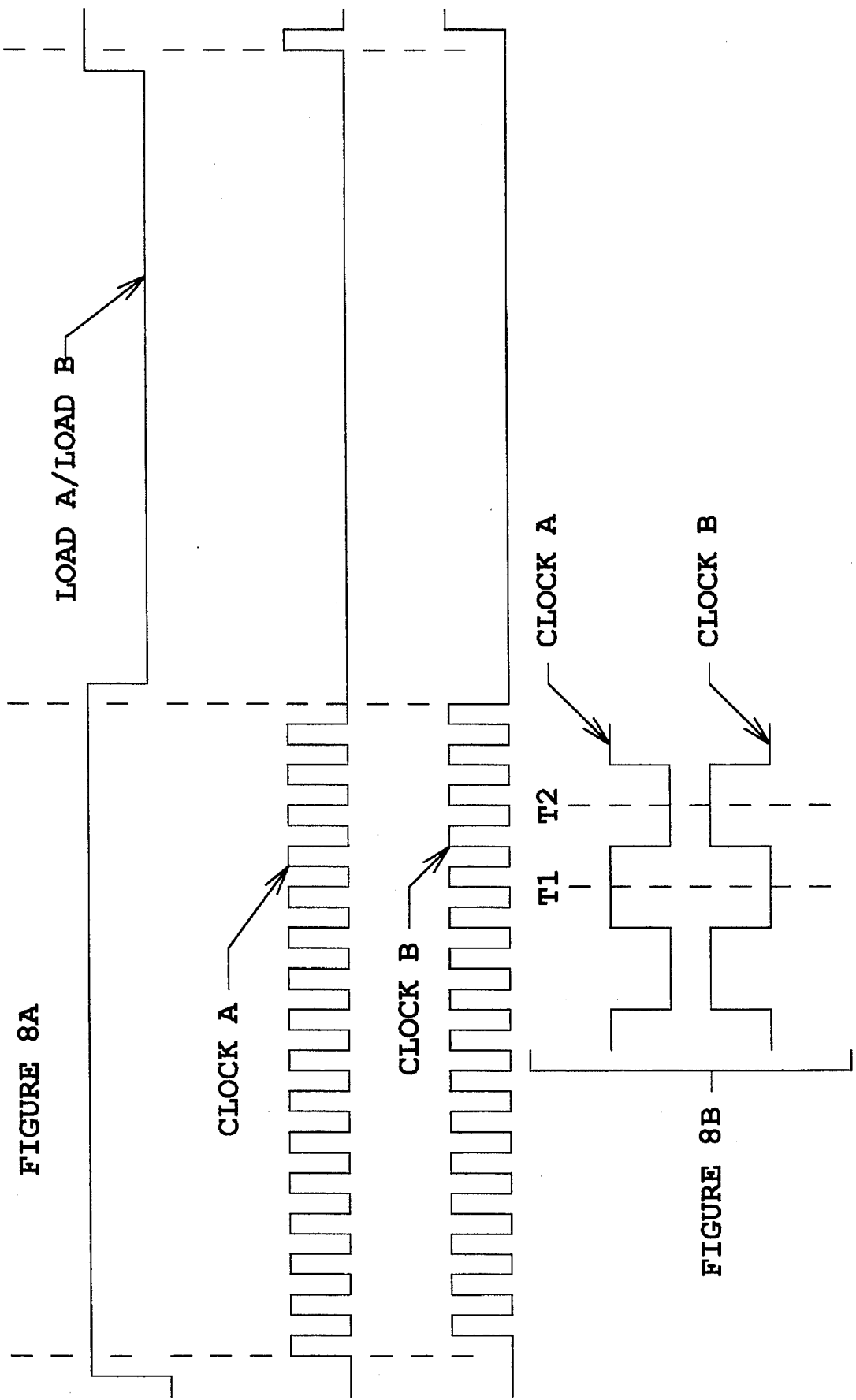

TRANSPONDER FOR INTERACTIVE DATA EXCHANGE BETWEEN INDIVIDUALLY USER-CONTROLLED COMPUTER-STEERED SYSTEMS

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

1. Technical Field of the Invention

The technical field of the invention is synchronization systems for linking a pair of user-controlled computer-steered systems at locations remote from each other over communication systems, and in particular the linking of the playing of identical computer-steered games to allow identical games to be interactively played by players remotely located with respect to each other.

2. Background of the Invention

Conventional two-player video games comprise a game console having a system control circuit operating under internal microprocessor control and governed by a plug-in game cartridge. The console has an output which is fed to a video monitor to show the course of the game. Two controllers are provided, one for each player, with each controller have typically a plurality of elements in the form of buttons, joy sticks, or similar actuators to be operated by the players to govern the conduct of the game. Each controller has a system control circuit which at regular intervals monitors the status of its associated actuating elements, forming them into a binary string representing a status word, and presenting the resulting status word in a controller output storage device connected to a controller output port. The console has two input ports adapted for connection to the controller output ports. The console control circuit periodically interrogates each controller to transfer its latest version of its status word into the console for processing to govern game play.

Various systems have been proposed to provide communication between two separate consoles over a communication system, such as telephone lines, which allows two players to compete with each other from distant locations. In such systems, such as that described in U.S. Pat. No. 4,570,930, issued to Matheson, communication is done over telephone lines using a modem to couple the two consoles together. Frame synchronization information must be provided by means of timing pulses from one console to the other. Each player has an identical game cartridge and views the progress of the game on his local monitor.

There is a need for a transponder system compatible with existing two-player units which can be plugged in between console and local controller and communicate with a remote unit over, for example, telephone lines, and further capable of asynchronous operation.

It is an object of the invention to solve this and related problems.

SUMMARY OF THE INVENTION

A transponder is configured for two way communication with a similarly configured remote transponder, each transponder being used to control an associated computer-steered system responsively either to received signals or to signals provided by a local control unit. In the exemplary form, a transponder for two-player game systems allows two game playing units remotely located from each other and playing identical games to communicate with each other for remote play operation. The transponder has two outlet ports adapted for connection to the two console input ports that normally are connected to a pair of controllers. The transponder has an input port adapted for connection to a controller appropriate for the game being played. The transponder preferably contains a modem for communicating with a similarly configured game system over a communication system, such as telephone lines.

The transponder is configured to formulate and transmit a binary command word in response to receipt of a command word from the remote unit. The command words include a status portion representing the sensings of the status of the controller and a control portion. The control portion includes an error detection code which is employed by each transponder to detect transmission errors in received words, and a confirmation code confirming or failing to confirm the error-free receipt of the last word received from the remote unit. Each command word sent is temporarily held in storage in the sending transponder. If the reply word received is error-free, and carries a confirmation indication in the confirmation code, then the received word and the previously transmitted word are simultaneously transferred to a pair of output storage registers. The contents are supplied to the game console responsively to demand signals sent from the console to the transponder. Each transponder therefore presents an identical pair of status words to its associated console. As configured for use with the "SUPER NINTENDO" system, the command words are 16 bits in length and are transmitted at 2400 baud. Under error-free conditions, an updated pair of status words are presented by the transponder to the console upon receipt of each command word, i.e. every 14 milliseconds. This is much less than the usual 33 milli-seconds between frames.

According to a further future of the invention, in the event of deliberate or accidental cross-connection of the connections between the transponder and the console, the transponder has a detection circuit for detecting such a condition. A cross-connection code is incorporated into the control word, and upon detection of such a condition, a cross-condition warning is encoded, a cross-connection indicator light is enabled, and data transfer from the transponder to the controller is aborted. A cross-connection warning is also inserted into the transmitted word whenever a cross-connection warning is received from the associated unit. Data transfer is similarly aborted under such circumstances. The result is that if either unit is cross-connected, both units go into abort mode with their cross-connection warning lights enabled.

Other features and advantages of the invention will be apparent from the following specification taken in conjunction with the following drawings.

DESCRIPTION OF THE DRAWINGS

FIGS. 3A–3E are flow diagrams representing program flow within the transponder of FIG. 2 when the transponder is configured as a master unit.

FIGS. 4A–4E are flow diagrams representing program flow within the transponder of FIG. 2 when the transponder is configured as a slave unit.

FIGS. 7A–7E are schematic diagrams of a transponder circuit.

FIGS. 8A–8B are timing diagrams relevant to the transponder circuit.

DESCRIPTION OF INVENTION

Figure 1:
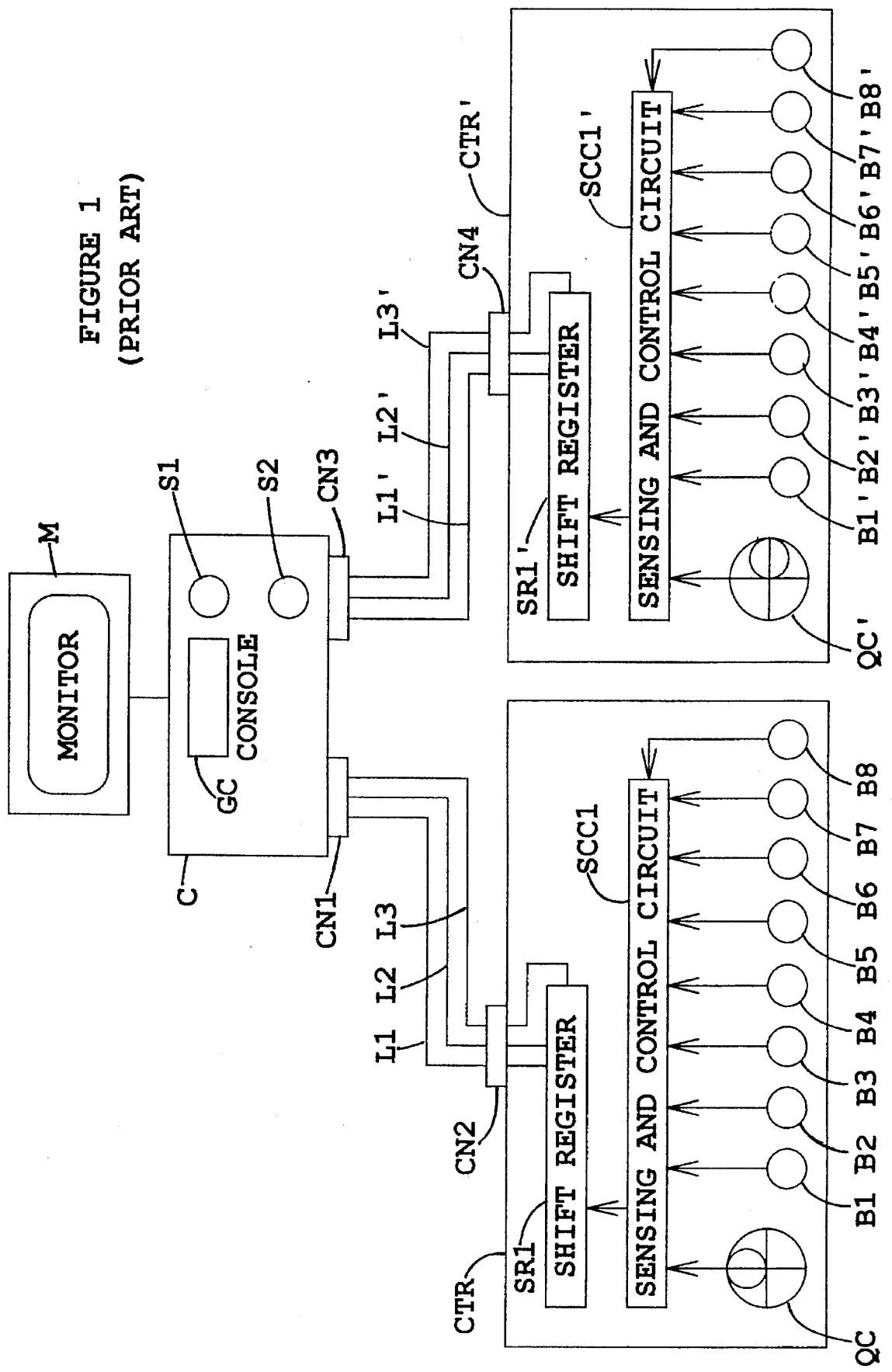
FIG. 1 is a functional block diagram of a conventional two-operator system for playing a program-steered game through a common console and monitor.

While this invention is susceptible of embodiments in many different forms, there is shown in the drawing and will herein be described in detail, a preferred embodiment of the invention with the understanding that the present disclosure is to be considered to as an exemplification of the principles of the invention and is not intended to limit the broad aspects of the invention to the embodiment illustrated.

One aspect of the invention is a transponder which permits a two-player computer-steered game to be played by players at locations remote from each other. Communication between the two players may be established over a variety of communication systems such as telephone lines, co-action lines, radio transmitter/receiver links, and related methods. To understand the operation of the remote play system, it is first necessary to consider a conventional non-remote two player system. Referring now to the drawings, and in particular to FIG. 1, there is shown therein a game console C governed by an insertable game cartridge GC which sets the rules and procedures for the conduct of the game. A pair of identical player-operable controllers CTR and CTR' are connected to the console C. Since the controller CTR and CTR' are identical, attention will be focused for the moment on controller CTR only. During the course of play, the player governs his conduct of the play by commanding a series of operations. In the example shown, the player is provided with a joy stick-type four quadrant controller QC and a plurality of buttons B1–B8. The instantaneous states of these user-operable control elements are in binary form, the state of these elements being sensed rapidly by a sensing and control circuit SCC1 and transferred into a shift register SR1. The contents of shift register SR1 are continuously updated by the aforementioned sensing process. Three lines L1, L2 and L3 convey commands between the console C and the shift register SR1 via connectors CN1, CN2. Data transfer is initiated when the interior circuitry of the console C changes the state on line L1. This serves to freeze the contents of the shift register SR1, and to place the shift register SR1 into a serial unload configuration. A string of clock pulses produced by the console C on line L2 clocks the contents of the shift register SR1 out onto the serial data line L3 and into the console C. The rival player operates an identical controller CTR', and command and data signals are similarly placed on lines L1', L2', L3' connected to the console C and the controller CTR' by connectors CN3, CN4 respectively. In both cases, the data strings set out on lines L3, L3" are of the order of 16 microseconds in length. The read cycle repeats every 16 microseconds or so.

Thus, two operators control the game play conducted within the console C, and a visual portrayal of the progress of the game is sent to a visual monitor M. The console C has a power on/off button S1 and a reset button S2 which serves to re-initialize a microprocessor (not shown) governing the operation of the circuitry within the console C. Operation of either button S1 or button S2 causes the system to be reinitialized to start a new game.

The foregoing has been a description of the general operation of consoles and controllers marketed under the names "NINTENDO" and "SUPER NINTENDO" marketed by Nintendo of America, Inc., of Redmond, Wash. A similar game system known as "SEGA GENESIS" is marketed by Sega of America, Inc., of Hayward, Calif., this later system using parallel line data transfer from output storage instead of the serial data strings previously discussed. The Sega system parallel loads up to eight 4 bit words which result in a 12 bit status word.

Figure 2:
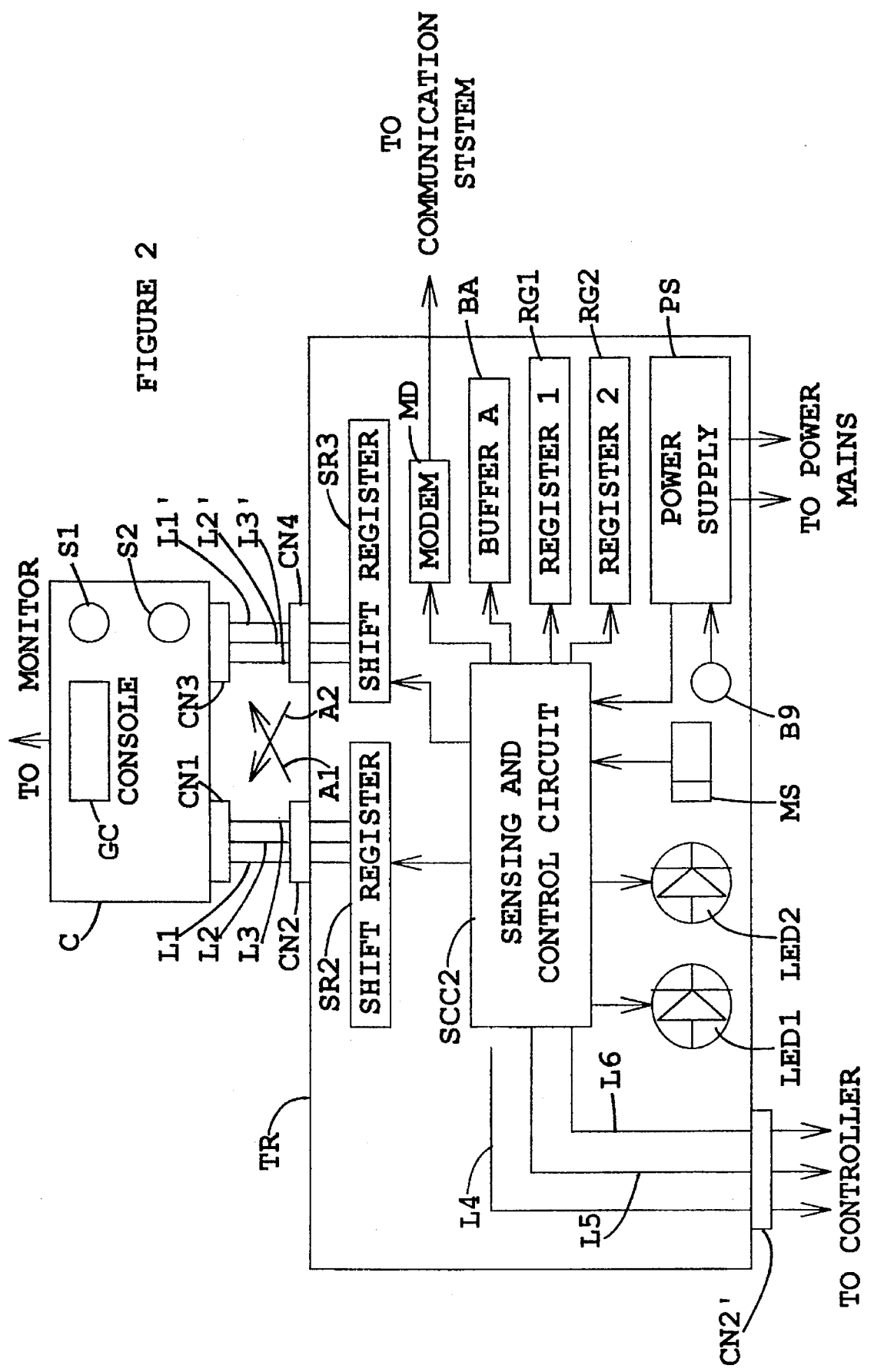
FIG. 2 is a block diagram of a transponder configured for insertion between a single local game controller and local console and providing for data transfer to and from a similarly configured remote system.

FIG. 2 shows the inventive system in generally block schematic form. A transponder TR is connected to the console C at console connectors CN1, CN3 and to the controller CTR via lines L4, L5, L6 joining connector CN2' and connector CN2 of the controller CTR (FIG. 1). The transponder TR, operating under the general control of a sensing and control circuit SCC2 powered by a power supply PS having an off-on switch B9 senses the contents of shift register SR1 (FIG. 1) and formulates a command word containing a status portion replicating this sensing. These command words are sent, typically by a modem MD over a communication system (not shown) to a corresponding modem in a similarly configured console-transponder-controller system loaded with a game cartridge providing a program identical to that provided by game cartridge GC of the controller C. Each unit sends a locally generated command word generated in an identical fashion. Received command words at transponder TR are decoded by the modem MD for processing by the sensing and control circuit SCC2. Both the last transmitted word and the word received in reply thereto are stored and processed in a group of storage registers BA (Buffer A), RG1 (Register 1), and RG2 (Register 2). Upon receipts of each command word its status portion and the stored last transmittal word are essentially simultaneously stored in output shift registers SR2 and SR3 respectively, to be present on demand when the console C sends the appropriate loading and clock signals over lines L1, L2, L1", L2".

The transponder TR is operable via a switch M/S to either a "master" or "slave" configuration. In operation, one system has its associated transponder TR set in master mode and the transponder of the other system is set in slave mode. This setting has two effects on the transponder TR. Since each transponder TR normally only sends a command word in reply to receipt of a command word, one transponder must take the lead in establishing communication by sending the initial command word. With the transponder TR in master mode, such a transmission will automatically occur, as will be subsequently discussed in more detail, responsively to resetting of the sensing and control circuit SCC2, typically by off-on operation of power supply switch B9. The unit configured as a slave waits passively until receipt of this initial transmission before initiating its reply. The other function of the master/slave mode selection is to insure that words from the master system always send the sensing of its associated controller through the appropriate input port of the console C, for example via connector CN1. Words received by the master must be sent to the other port of console C, here taken to be via connector CN3. At the slave, this must be reversed so that received words are sent to the port counterpart to connector CN1 and replicas of transmitted words are sent to the counterpart of connector CN3. This preserves the proper identity of the players as seen by the console C as shown in FIG. 1.

The command words sent from the transponder CR contain the previously mentioned status portion indicating the status of the associated local controller and a control portion including an error detection code, a confirmation code indicative of error-free reception of the latest word received, and a cross connection code indicative of either accidental or deliberate interchange of the output of shift registers SR2 and SR3 as indicated by arrows A1, A2. A detailed discussion of these control codes will be temporarily deferred to facilitate discussion of a central novel feature of the invention, namely the matching of word pairs for presentation to the console C at both the local and the remote unit.

Figure 3A:
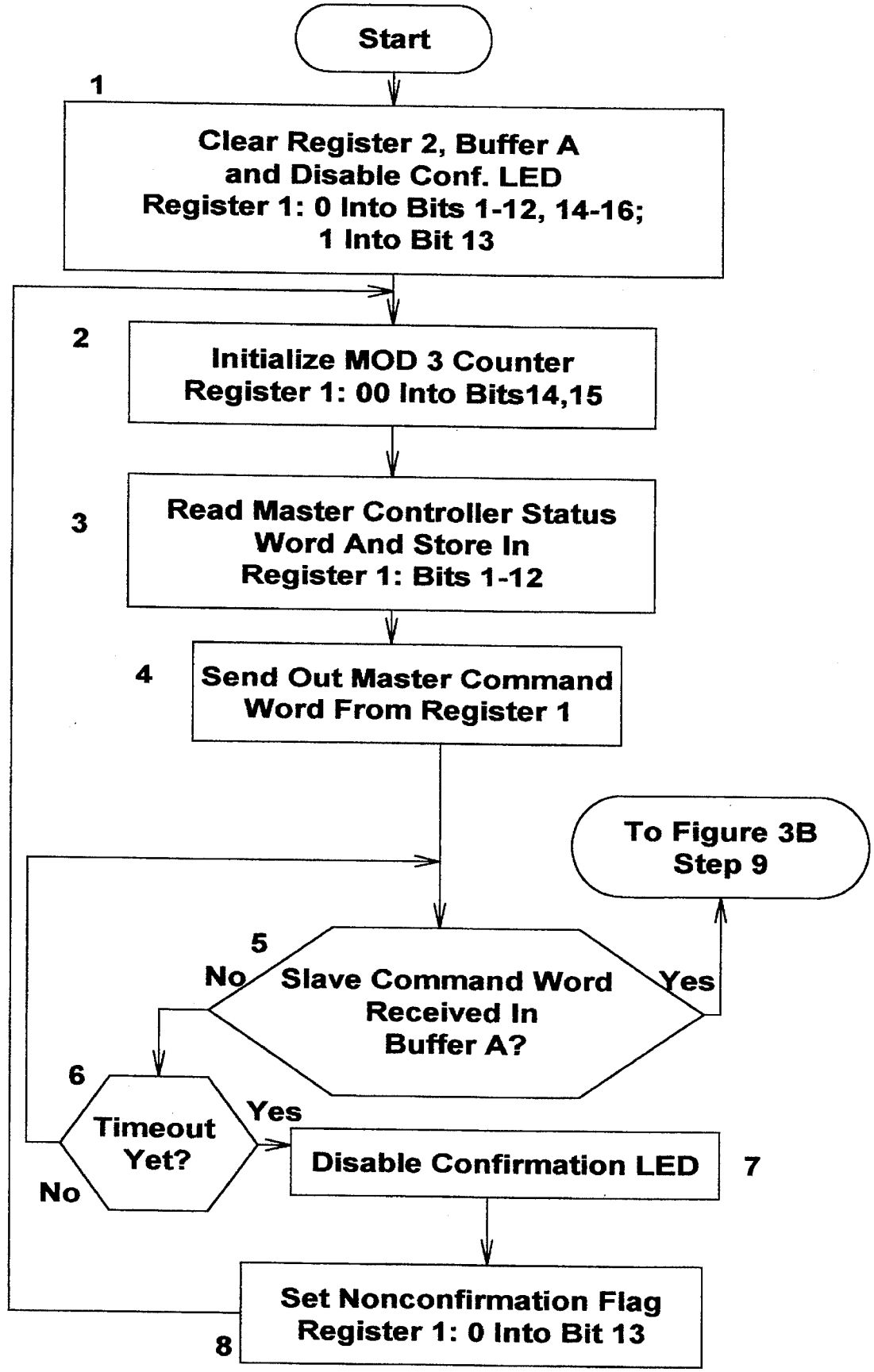
Figure 3B:
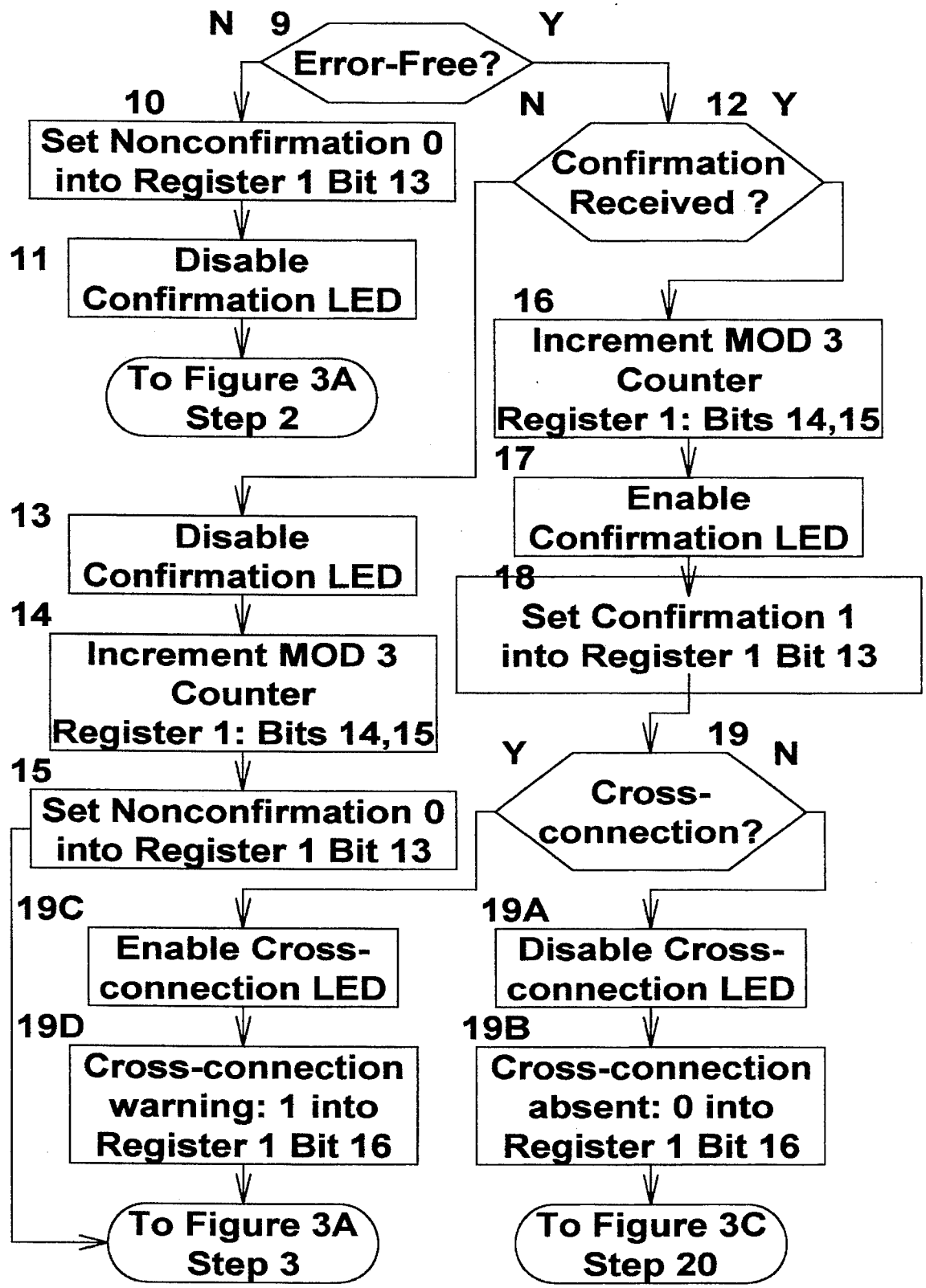
Figure 3E:
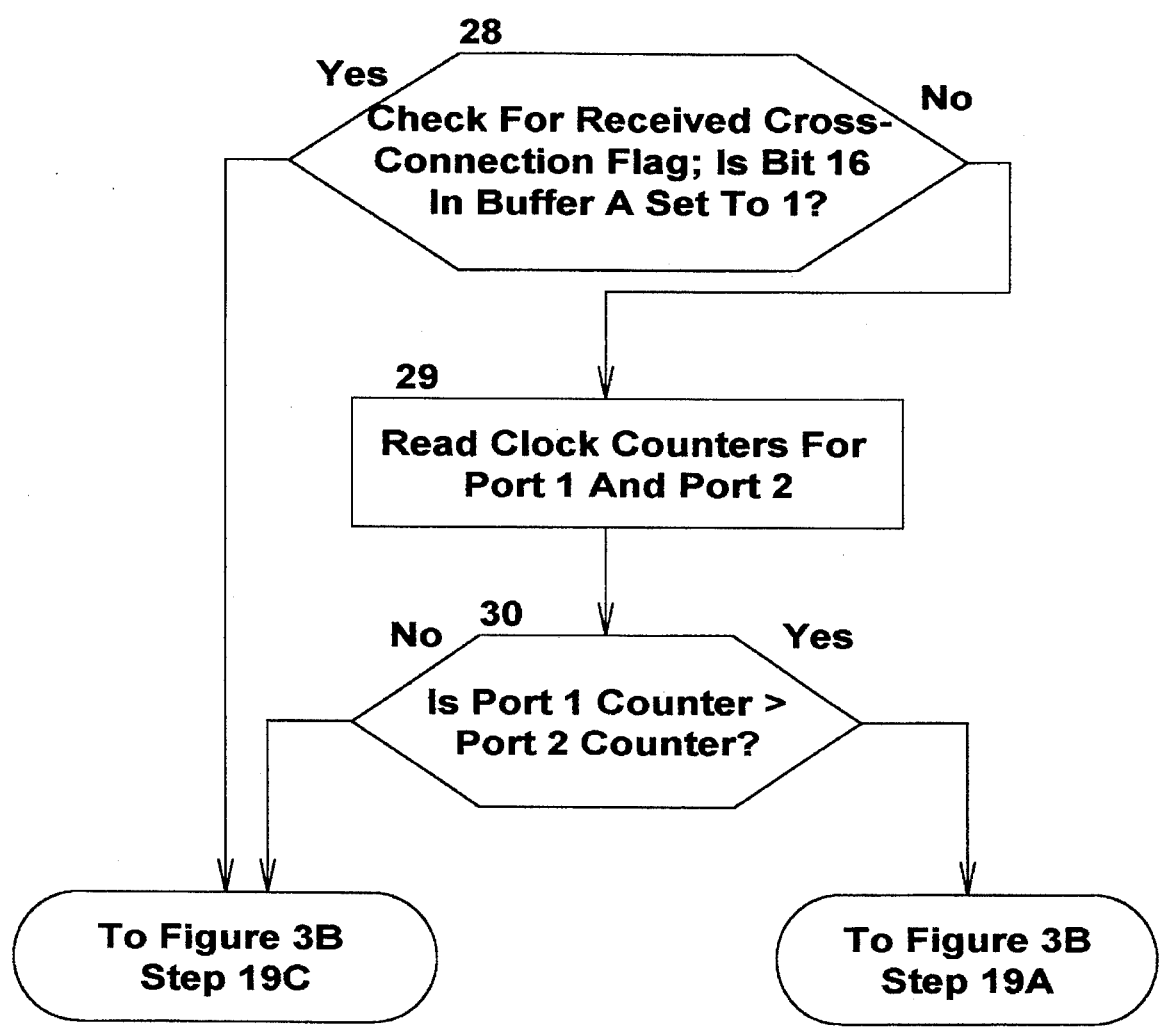

FIGS. 3A–3E are flow diagrams representing the program of the transponder TR when operated in master mode. FIG. 3E is an expansion of step 19 shown in FIG. 3B.

Figure 4B:
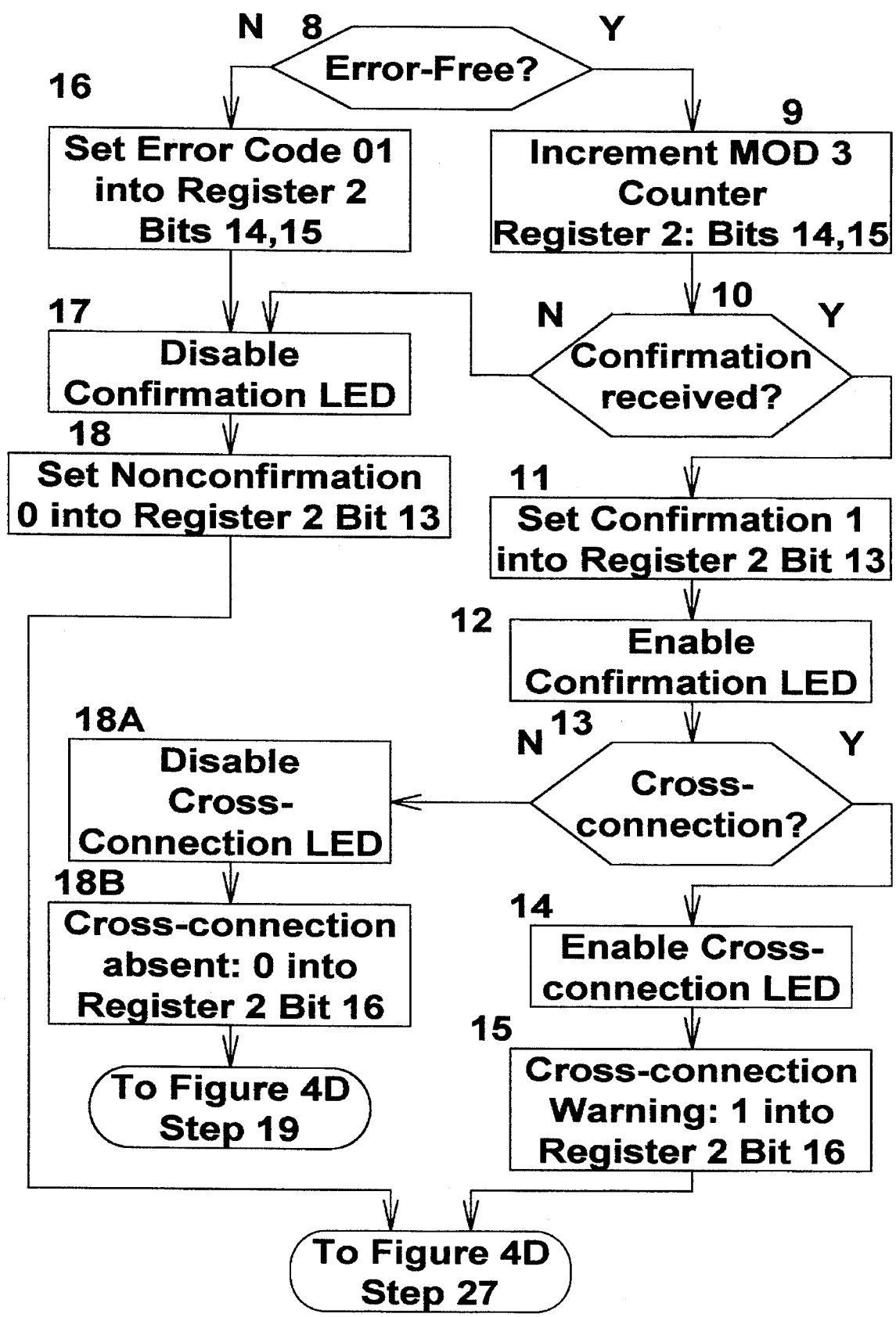
Figure 4C:
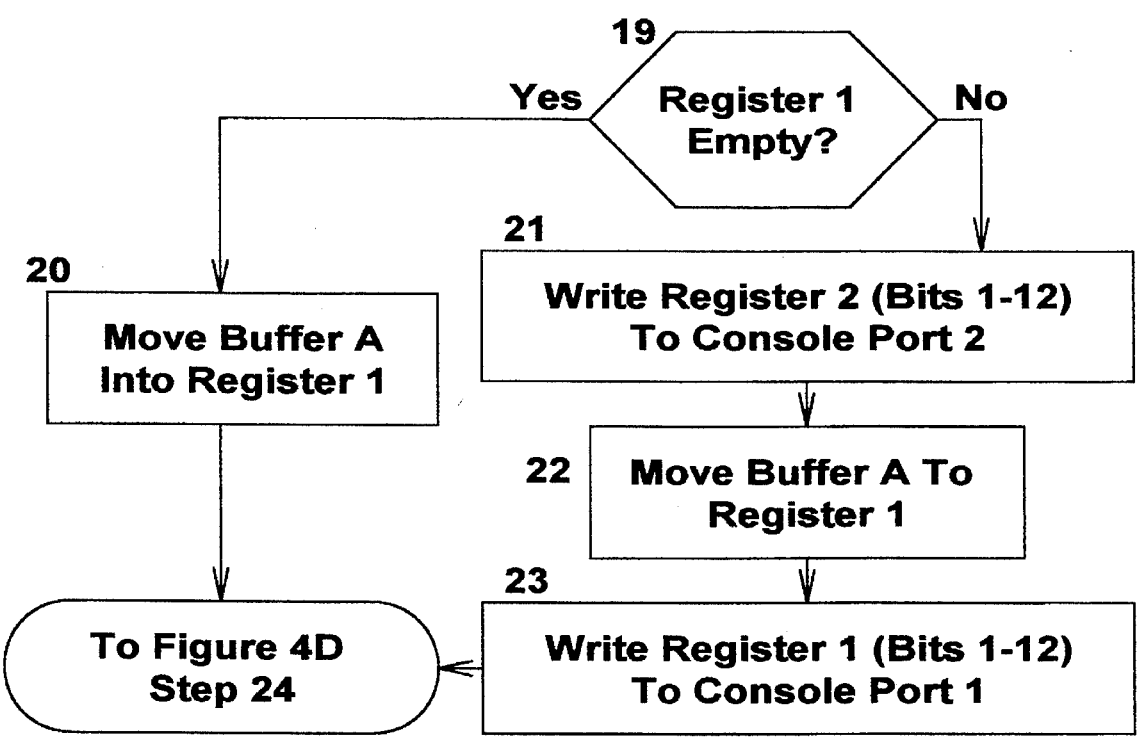
Figure 4E:
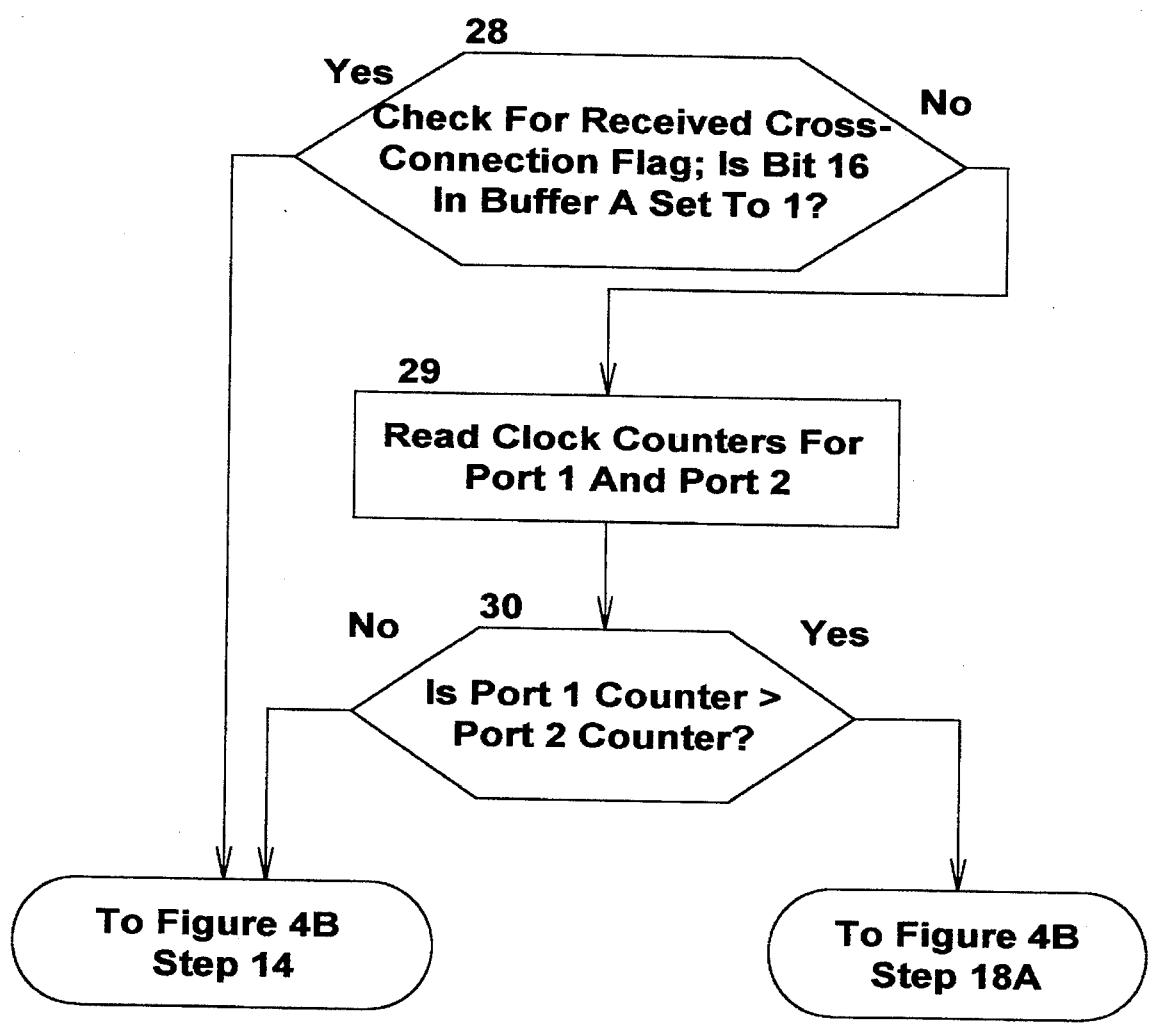

FIGS. 4A–4E are the flow diagrams governing operation of the transponder when in slave mode. FIG. 4E is a detailed expansion of step 13 of FIG. 4B.

Figure 5:
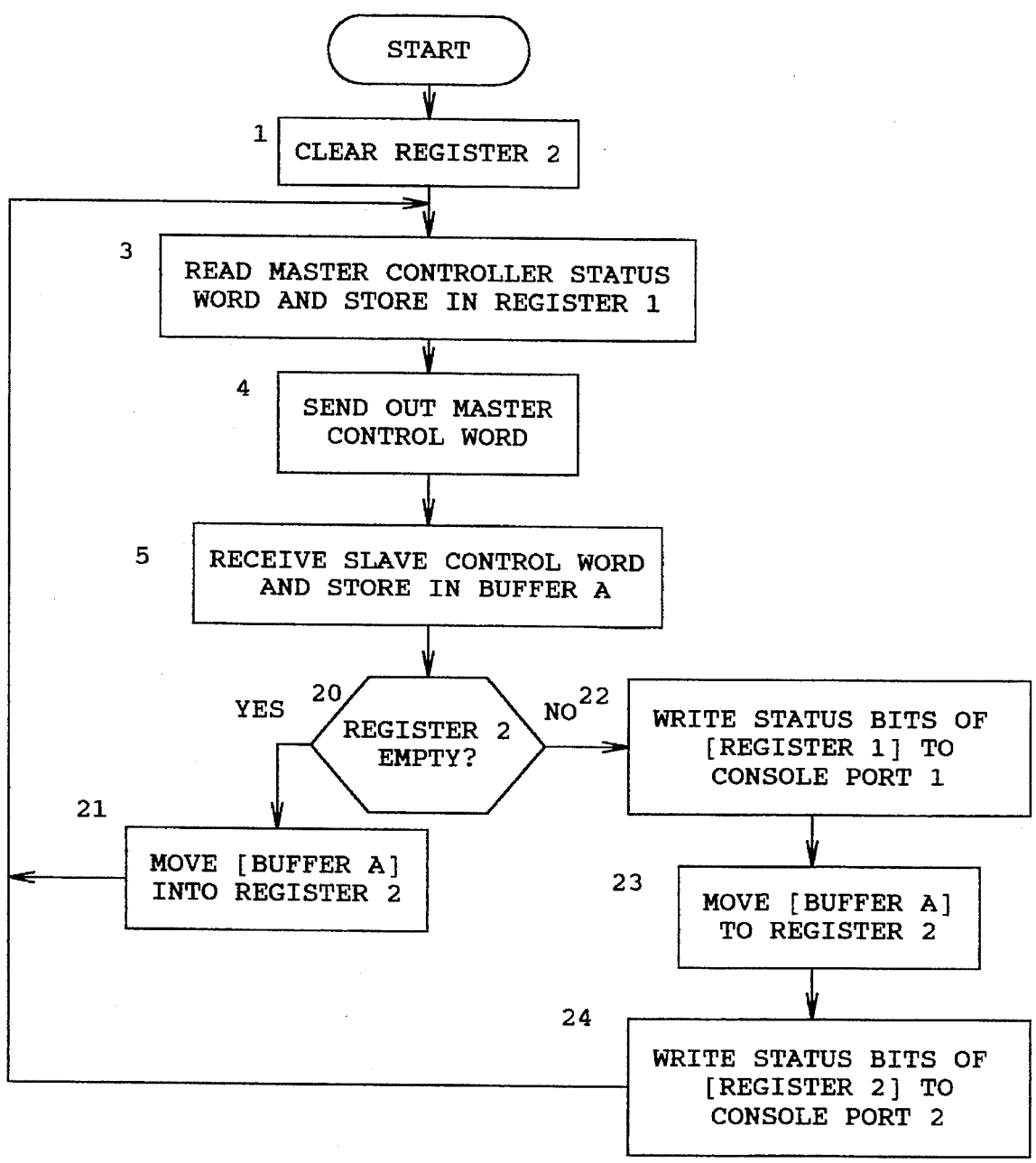
FIG. 5 is a simplified flow chart corresponding to the operations shown in FIGS. 3A–3E under error-free transmission conditions.

FIG. 5 is a simplified flow diagram showing the relevant steps of the operation of the transponder TR when configured as a master under conditions of ideal transmission and reception i.e. no errors received in the incoming signals from the remote unit, no indication of cross connection, and in all cases receipt of a confirmation of proper reception by the remote unit of the last word transmitted by the master.

Figure 6:
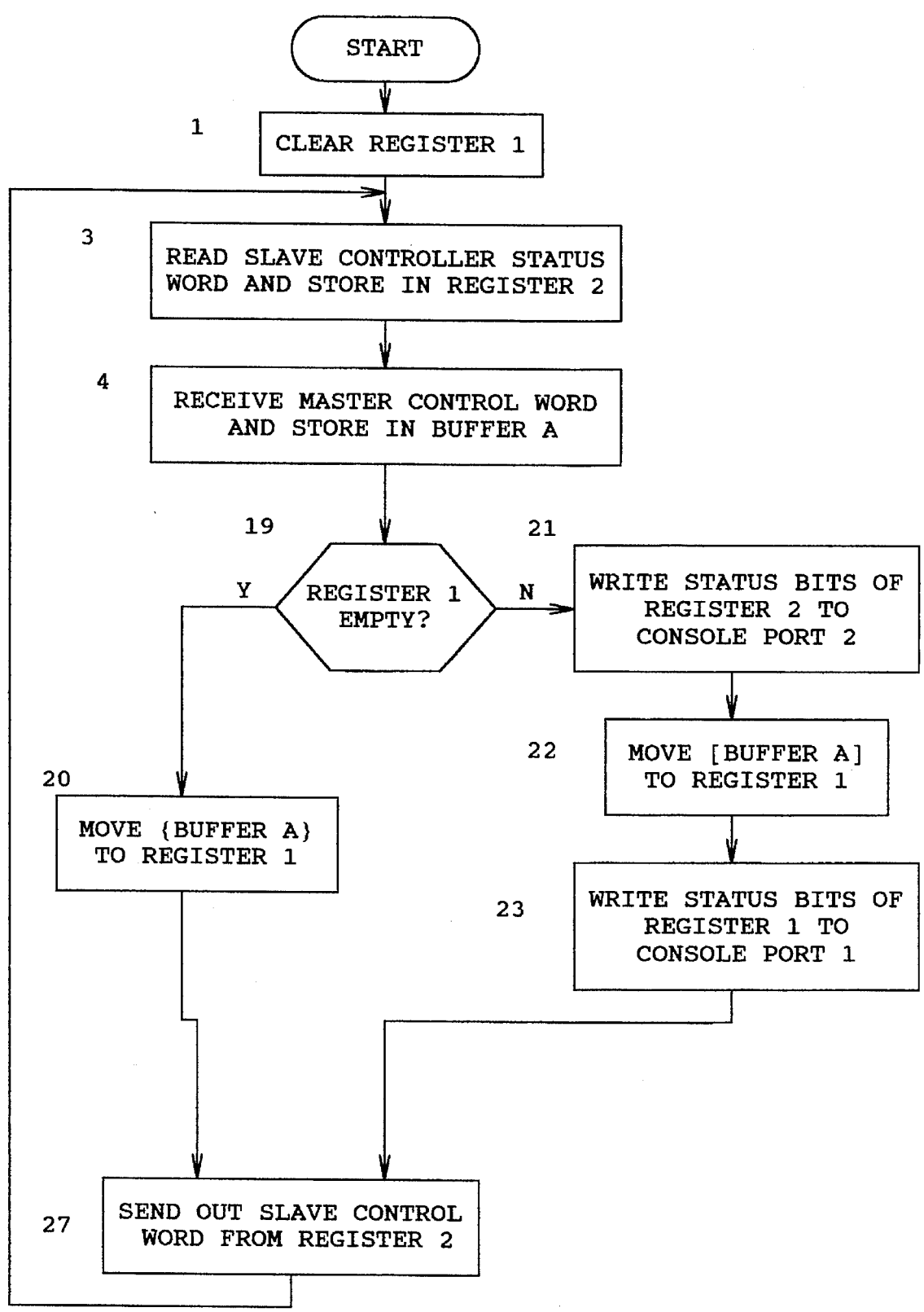
FIG. 6 is a simplified flow chart corresponding to the operations shown in FIGS. 4A–4E under error-free transmission conditions.

FIG. 6 is a similar representation for the slave unit. Table 1 shows the contents of Register 1, Register 2, Buffer A, and "Port 1", and "Port 2", here used to designate shift registers SR2 and SR3. Table 2 shows the status of counterpart registers and ports during the same few initial cycles of transmission as produced at the slave unit.

TABLE I

| | | MASTER | | | |
|---|---|---|---|---|---|
| STEP | REGISTER 1 | REGISTER 2 | BUFFER A | PORT 1 | PORT 2 |
| 1 | — | 0--0 | — | — | — |
| 3 | M1 | 0--0 | — | — | — |
| 5 | M1 | 0--0 | S1 | — | — |
| 21 | M1 | S1 | S1 | — | — |
| 3 | M2 | S1 | S1 | — | — |
| 5 | M2 | S1 | S2 | — | — |
| 22 | M2 | S1 | S2 | M2 | — |
| 23 | M2 | S2 | S2 | M2 | — |
| 24 | M2 | S2 | S2 | M2 | S2 |
| 3 | M3 | S2 | S2 | M2 | S2 |
| 5 | M3 | S2 | S3 | M2 | S2 |
| 22 | M3 | S2 | S3 | M3 | S2 |
| 23 | M3 | S3 | S3 | M3 | S2 |
| 24 | M3 | S3 | S3 | M3 | S3 |

TABLE II

| | | SLAVE | | | |
|---|---|---|---|---|---|
| STEP | REGISTER 1 | REGISTER 2 | BUFFER A | PORT 1 | PORT 2 |
| 1 | 0--0 | — | — | — | — |
| 3 | 0--0 | S1 | — | — | — |
| 4 | 0--0 | S1 | M1 | — | — |
| 20 | M1 | S1 | M1 | — | — |
| 3 | M1 | S2 | M1 | — | — |
| 4 | M1 | S2 | M2 | — | — |
| 21 | M1 | S2 | M2 | — | S2 |
| 22 | M2 | S2 | M2 | — | S2 |
| 23 | M2 | S2 | M2 | M2 | S2 |
| 3 | M2 | S3 | M2 | M2 | S2 |
| 4 | M2 | S3 | M3 | M2 | S2 |
| 21 | M2 | S3 | M3 | M2 | S3 |
| 22 | M3 | S3 | M3 | M2 | S3 |
| 23 | M3 | S3 | M3 | M3 | S3 |

Considering first initiation of communication by the master, the status of the master controller CTR is stored in Register 1 at step 3, thereafter being immediately sent out at step 4. In Table 1 the first master word, indicated as M1, is shown as present in Register 1. The master then waits for the slave to reply at step 5. Considering FIG. 6, the initial action of the slave is to read the status of the slave controller and to store it in Register 2 at step 3, this first slave status word being indicated as S1. At step 4, upon receipt of the master control word, this control word M1 is stored in Buffer A at step 4. Since Register 1 at this time is empty, the master word M1 stored in Buffer A is moved to Register 1. At this point, the slave sends out its first transmission at step 27, namely the word S1 stored in Register 2. Returning now to FIG. 5, in Table 1 at step 5 the master receives the slave control word 51 and stores it in Buffer A. Since Register 2 is empty at step 20, the branching is such as to move the contents of Buffer A, namely slave word S1, into Register 2. Control now reverts to step 3 and the second master status word M2 is read and stored in Register 1 and sent out at step 4. Referring now to FIG. 6 and Table 2, upon receipt of the next master control word M2, this word is stored in Buffer A at step 4. Register 1 is no longer empty, at step 21 the status bits contained in Register 2 are written to console Port 2 to place S2 in shift register SR3. In step 22, the contents of Buffer A, now M2, is moved to Register 1 and thereafter in step 23 the master word M2 is sent to console Port 1 i.e. shift register SR2. Note that at this point the slave has presented the words M2 and S2 at the appropriate ports to be ready for demand interrogation from the associated controller.

Referring now to FIG. 6 in Table 1, the slave control word S2 is received and stored in Buffer A at step 5. Here, register 2 is no longer empty and at steps 22, 23 and 24 the contents of register 1, namely M2, are sent to Port 1. The contents of Buffer A, namely S2, is sent to register 2, this word then being outputted to console Port 2. An identical cycle then repeats at both units outputting command words M3, S3 at both slave and master. It will be noted that in both units the master words are sent to Port 1 and the slave words are sent to Port 2, thereby preserving proper identification of the players for execution of the identical stored game programs.

As will subsequently be discussed in more detail, each command word consists of sixteen bits, the first twelve representing the controller status and the remainder dealing with the previously mentioned error, cross-connection, and confirmation codes. In the previously described error-free cycles, all transmissions are carried out at a minimum rate of 2,400 baud. It is evident that a given transmission and its associated reply would require approximately 14 milliseconds for completion, a time much less than the normal 33 milli-second framing interval of images sent to the monitor M (FIG. 1) by the console C.

The command codes are formatted as follows:

Bits 1–12 are the status portion of the command code, and give the status of the local controller.

Bit 13 is a confirmation bit governed by an error detection code (bits 14, 15) of a received command word. A 1 confirmation bit in a word sent out means that the previous word was received error-free. A 0 in this bit signifies that an error was detected in the last received transmission. Bits 14, 15 are the previously mentioned error code detection bits. By prearrangement, one player configures his transponder as master and the other as slave. The master sends only 00 or 10 as its error detection code. The slave sends only 01 or 11. If a proper error code is received, the receiving unit increments the received error code by 1 on a modulo three basis and appends it to the reply word it sends out. It is assumed that line noise will perturb the error code during transmission. If an improper code is received, the received word cannot be trusted, and abort procedures are followed, as will be discussed below. Other forms of error detection code as, for example, parity bits, may alternatively be equally well employed.

Bit 16 is a cross-connection flag. Each transponder will set this bit equal to 1 in its next transmission if (a) a similar cross-connection flag "1" is received, or (b) cross-connection is detected at the transponder by an internal test, as will be discussed further on. Similar abort procedures then are followed, resulting in no passage of the status portions of the latest received and last transmitted words to the output shift registers SR2, SR3 (FIG. 2). Note that as a result, both the master and slave units will thereafter be locked into such abort modes until the situation has been rectified. FIGS. 3A–3E are flow diagrams representing program flow within a transponder of FIG. 2 when the transponder is configured as a master unit. FIGS. 4A–4F are flow diagrams representing the program flow within a transponder of FIG. 2 when the transponder is configured as a slave unit. With reference to the master flow sheet shown in FIG. 3A, at step 1 cross-connection code "0" is set into bit 16, and a confirmation bit "0" is set into bit 13 at step 1. At step 2, the error code is initialized at "00", and the command word is sent out at steps 3 and 4. Upon receipt of a reply (step 5) branching is to the testing routines shown beginning at step 9 in FIG. 3B. As can be seen by inspection, if the received word is error-free, the confirmation bit indicates error-free reception on the part of the other transponder and the cross-connection code indicates no cross-connection, then branching goes to the sequence extending from step 20 of FIG. 3C through step 27 of FIG. 3D to finish the remainder of the sequence as simplified in the flow chart of FIG. 5.

Considering next the effects of warning conditions in the received word, it will be seen from FIG. 3B that if the word is not error-free, it is useless, and a non-confirmation "0" bit is set into bit 13 to be incorporated into the next word transmitted. A confirmation LED (LED1 of FIG. 2) is enabled by receipt of an error-free word, so in this case LED1 is disabled. Presentations to the shift registers SR2 (Port A) and SR3 (Port B), i.e. the sequences shown in steps 20–24 of FIG. 3, are bypassed. Program return is then to step 2 of FIG. 3A. The error-detection code is re-initialized to "00", a new master word is set out, and the cycle repeats.

If a confirmation is not received, then the last word received the remote unit is not error-free, and as a result the confirmation LED (LED1) is disabled. However, at this point in the testing process, the reception of this word by the local unit is error-free. Therefore, the received error-detection code is incremented by one step on a modulo three basis in bits 14 and 15. The non-confirmation flag is set to "0" and as before, the port transfers of FIG. 3C are by-passed, program return is to step 3 of FIG. 3A, and a new master word is sent out. If, on the other hand a confirmation is received, the error-detection code is incremented by one, confirmation LED1 is enabled (FIG. 3B, step 17) and a confirmatory "0" is set in bit 13 as shown in FIG. 3B, step 18.

Finally, cross-connection is tested. The details of this test are detailed in FIG. 3E, which will be discussed subsequently. If either a cross-connection warning has been received or if a cross-connection is internally detected, the cross-connection LED (LED2) is enabled, a warning flag "1" is set into bit 16, and as before, the program sequence forwarding data word pairs to the output Ports A and B are by-passed, and signal flow reverts to FIG. 3A, step 3. If a cross-connection warning is neither received nor locally detected, then the cross-connection LED2 is disabled, a "0" flag is set into bit 16, and program flow proceeds to normal port forwarding as set forth in FIGS. 3C and 3D.

Similar procedures are carried out at the unit when in slave mode, as outlined in the flow charts of FIGS. 4A–4E. It should be noted that once a cross-connection warning has been sent out, then both master and slave are locked into a disabled state, aborting all word pair presentations, and both remain in this state until the cross-connection problem is resolved.

A timeout feature is provided in both the master and the slave configurations. Part 68 of the Federal Communication Requirements dictate that if a telephone line is in a zero information transmission state for more than a given period of time, any automatic equipment in communication with the telephone line must be disconnected from the line. Accordingly, in the event that either the master or the slave fails to receive a word in reply within a period of approximately three seconds, the confirmation LED is disabled, a non-confirmation flag "0" is set into bit 13, and a new command word is sent out. This timeout feature is shown in FIG. 3A in steps 6, 7, 8 and in FIG. 4A in steps 5, 6 and 7. A program listing in the language known as "C language" is shown in Table III at the end of the specification.

Figure 7A:
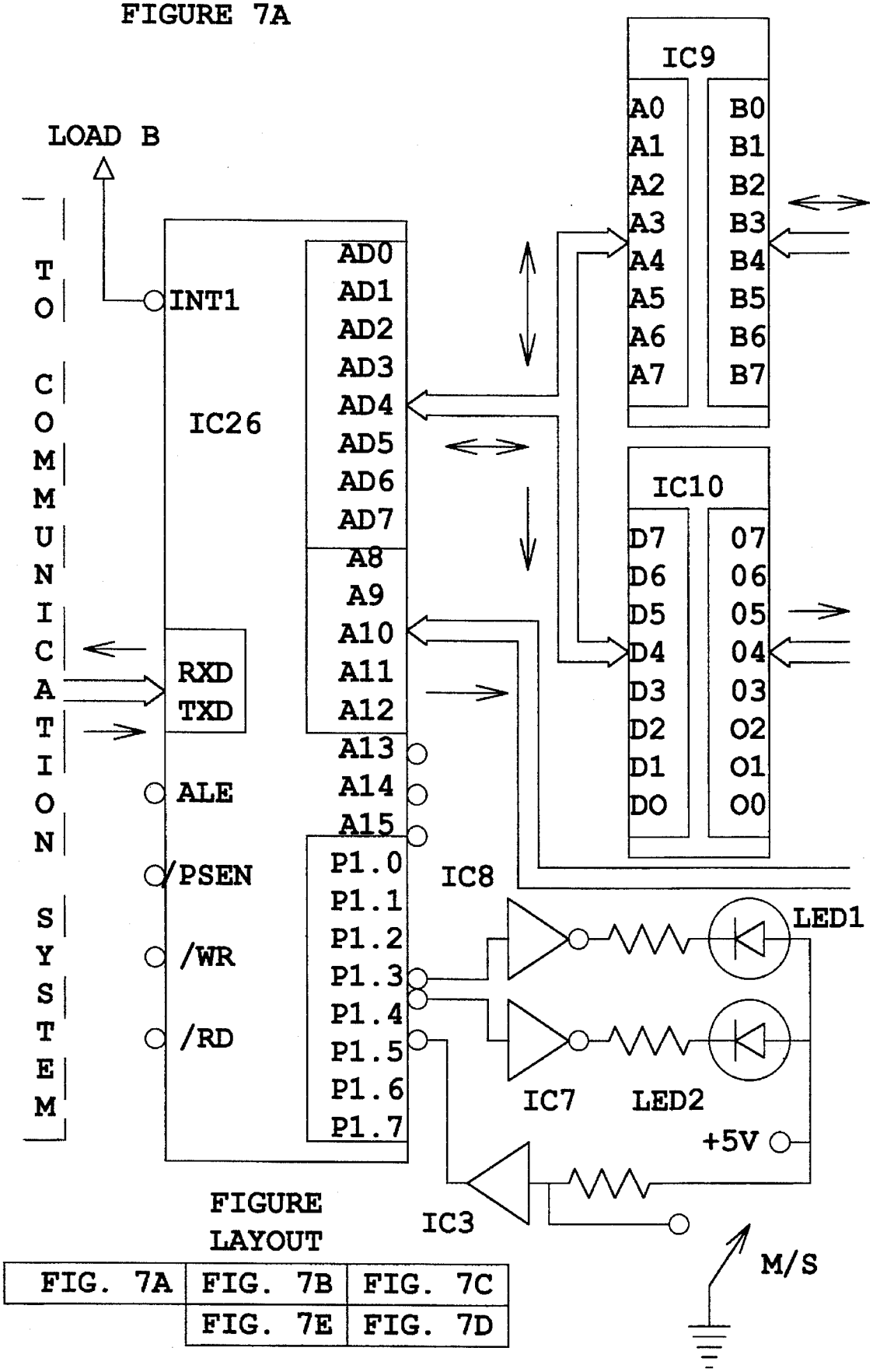
Figure 7B:
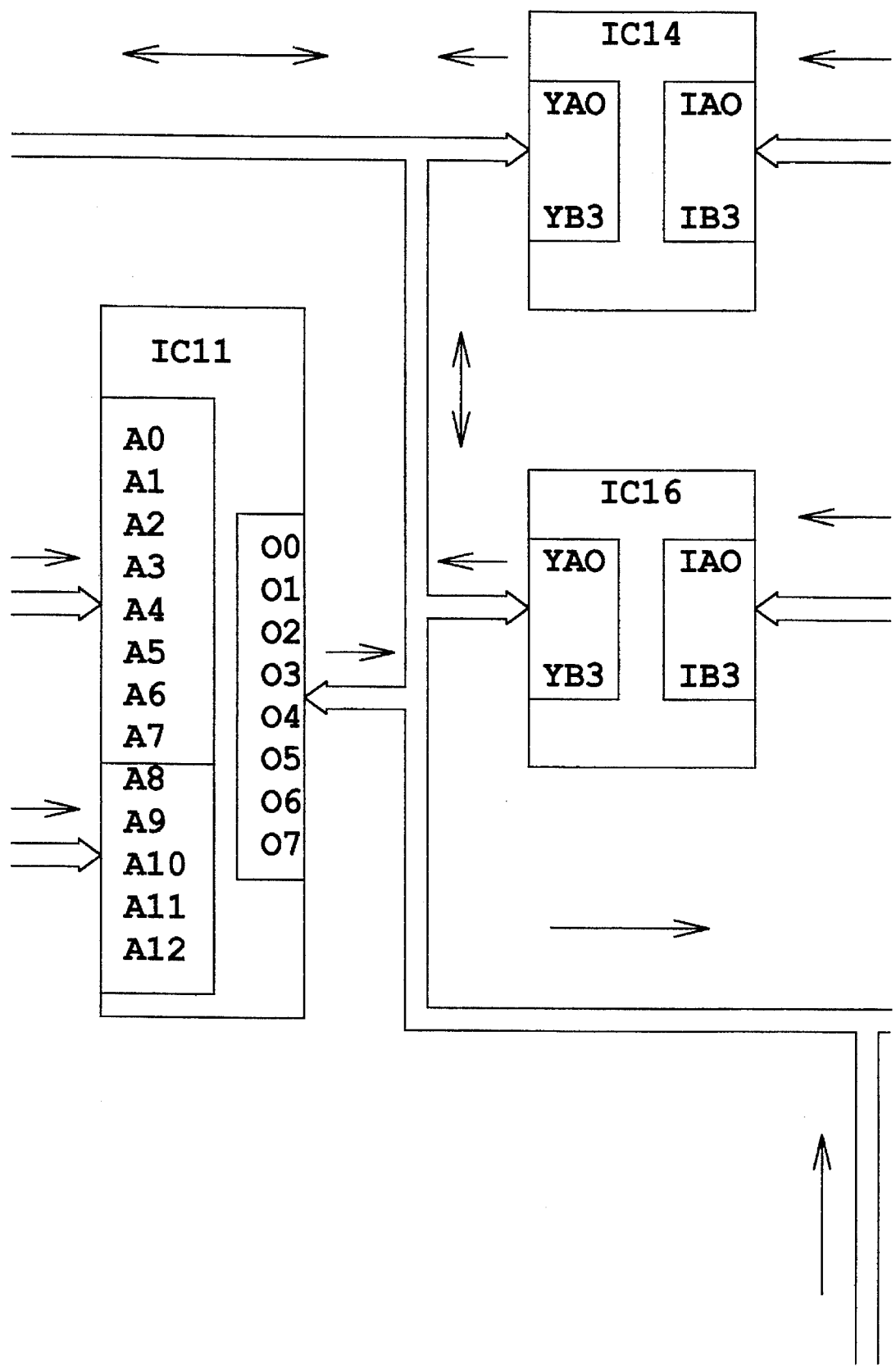
Figure 7C:
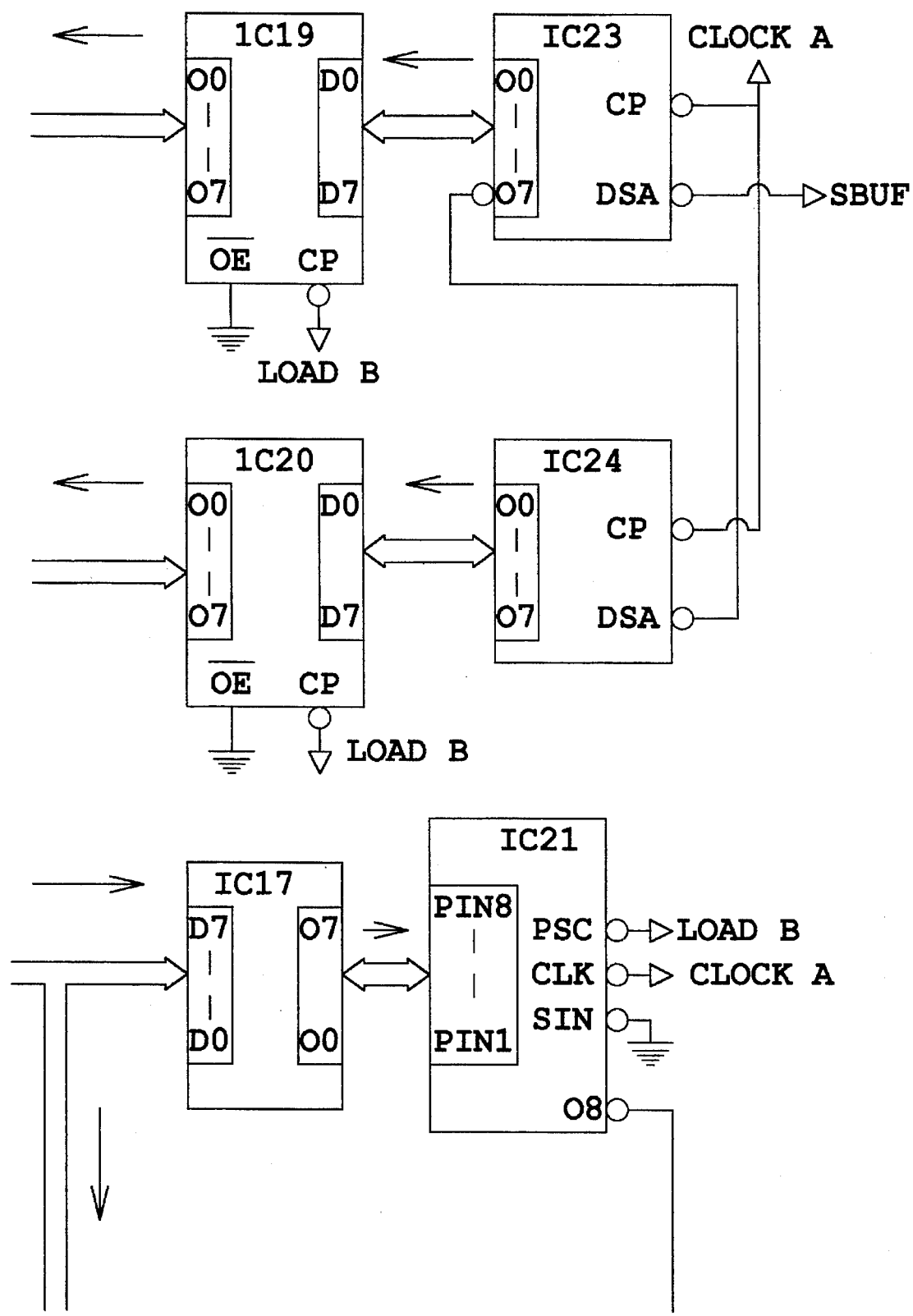
Figure 7D:
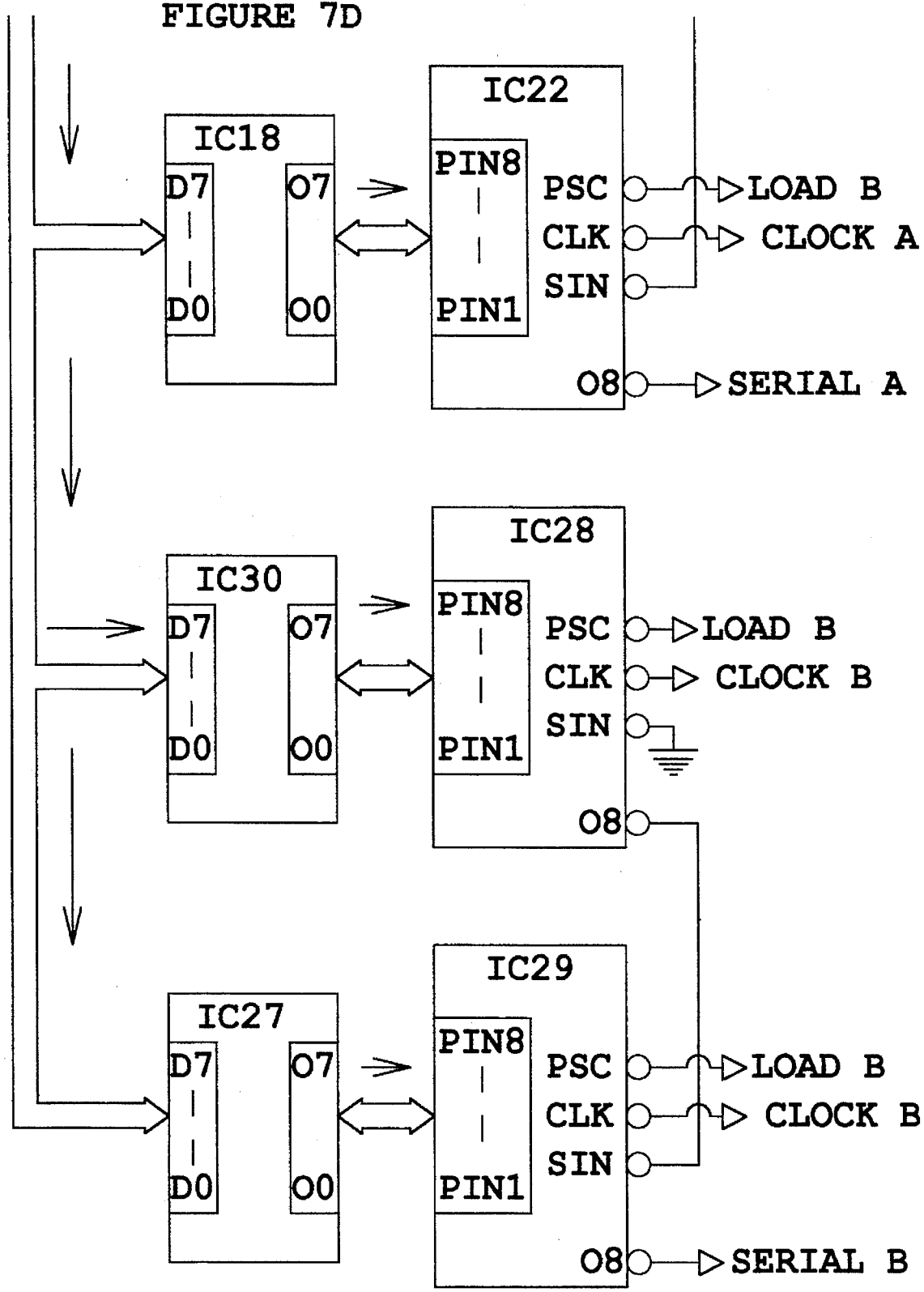

FIGS. 7A–7E are circuit implementations of the flow charts, and Table IV is a list of the integrated circuits shown in FIGS. 7A–7E. Referring now to the circuit implementation, chip select hardware has been omitted. It is achieved by conventional means evident to those skilled in the art by means of control points on the microprocessor IC26, these points being A13, A14, A15, ALE,/PSEN,/WR,/RD, INT1. The figures are designed to register with each other, the proper layout being indicated at the bottom of FIG. 7A. With respect to connectors CN2, CN4, CN2" (FIG. 2) these connectors and the lines they service are shown at the bottom of FIG. 7E. In the "SUPER NINTENDO" system, the load signals produced on lines L1 and L1" are simultaneous signals. As a result, only the LOAD B line of connector CN4 is used for such control purposes.

Overall control is exercised by microprocessor IC26, and selective control is exercised by signals from the LOAD B terminal of connector CN4 (FIG. 7E). As shown in FIG. 7A, the system is multiplexed using the bi-directional I-O terminals AD0-AD7 communicating with multiplexing selectors IC9 and IC10 under microprocessor control. With respect to the communication system (FIG. 7A), input and output serial command words are passed by terminals RXD and TXD respectively of a UART within the microprocessor IC26. All operations on incoming words from this source are processed in IC26. The elements BUFFER A (BA), REGISTER 1 (RG1), REGISTER 2 (RG2), symbolically shown in FIG. 2 are internal to the microprocessor IC26. The operating program for this system is stored in read-only memory IC11.

Incoming data from the local controller is received via connector CN2" (FIG. 2 and FIG. 7E). It will be recalled that line L4 is the load line, L5 is the clocking line, and L6 is the serial data line. 8 bit serial data is passed into a serial-to-parallel converter IC23 from terminal SBUF. The overflow (bits 9–16) are passed into a similar converter IC24. When the clock B pulses from console C (FIG. 2) cease, the train is frozen in storage. When the next LOAD B signal is received, the contents of converters IC23 and IC24 are frozen in latches IC19, IC20. A microprocessor command actuates the latches IC14, IC16 to deliver sequentially high byte and low byte 8 bit stored words to the microprocessor IC26 via multiplexing selector IC9.

Outgoing words destined for the console are similarly sent in 2 byte pairs from the microprocessor IC26 to, in one case, two storage latches IC17, IC18. The contents of these latches are parallel loaded into two shift registers IC21, IC22. Shift register output is triggered by a signal on the LOAD B terminal and are clocked out by signals on terminal CLOCK A. The 16 bit string is outputted to the SERIES A line terminal and thus 2 line L3 of connector CN2 for transfer to connector CN1 of console C.

The output to line L3" of connector CN4 and thence to connector CN3 of console C is accomplished in a similar way via latches IC27 and IC30 and shift registers IC28 and IC29. Here the LOAD B line pulse loads the shift registers IC28 and IC29 and CLOCK B line pulses move via data string out to the SERIAL B terminal, i.e., to line L3". During the waiting period between serial unloads, whatever the contents of latch IC17 are, they are immediately replicated in the shift register IC21. Whenever the contents of latch IC17 are updated, the updated word is immediately transferred to shift register IC21. Thus, no matter when the LOAD B signal is applied to shift register IC21, its contents are always full and its contents are available for immediate serial output. Similar considerations apply to latches IC18, IC30, IC27, and shift registers IC22, IC28, and IC29. This feature of continuously loading and updating the contents of the shift registers allows asynchronous operation of the local and remote transponders.

Finally, the cross-connection programming and circuitry will be discussed. FIG. 8A shows a timing diagram for the console pulses produced by the "SUPER NINTENDO" console. The LOAD A and LOAD B signals are produced simultaneously, and the contents of shift registers IC21 and IC22 are pulsed out by the CLOCK A signals. The contents of the shift registers IC28 and IC29 are clocked out by the CLOCK B pulse signals, this latter wave train being delayed in phase by approximately one-half a clock period. The CLOCK A and CLOCK B pulse trains are of identical frequency.

Referring to FIG. 7E, the LOAD B pulse clears the two scale-of-16 counters IC36 and IC37. Thereafter, the count stored in IC36 is incremented with every leading edge of the subsequent CLOCK A pulses. Similarly, the count in counter IC37 is incremented by the leading edge of each CLOCK B pulse. Referring to FIG. 7A, the leading edge of the LOAD A/LOAD B pulse activates pin INT1 of the microprocessor IC26. At this time, the processing of the main sequence shown in the flow diagrams stops and after a given time interval freezes the contents of the 8 bit latch IC35 to replicate via terminals IAO-IA3, the contents of counters IC36 and IC37. The contents of latch IC35 are then placed in memory in the microprocessor IC26, and normal program flow resumes. Referring to FIG. 8B, if latch IC35 is actuated at time T1, then the contents of counter IC36 will be one count higher than the contents of counter IC37. Use of this is made to detect either accidental or deliberate cross-connection of connection lines as indicated by arrows A1, A2 of FIG. 2.

If, on the other hand, latch IC35 is frozen at time T2, then the counts will be equal. To insure that the CLOCK A count is higher than the CLOCK B count, the time between the activation of the interrupt INT1 of the microprocessor IC26 to the time that the microprocessor commands freezing of the latch IC36 must be properly set. A wait state of suitable length must be incorporated into the sub-program invoked by the interrupt.

Assuming that the time T1 is properly set, then the contents of shift register IC36 (Port 1 counter) will be greater than the contents of the shift register IC37 (Port 2 counter). The composite count, stored in the latch IC35 is immediately passed into storage in the microprocessor at the end of the interrupt cycle. If, however, the connection lines are reversed as indicated by arrows A1, A2 in FIG. 2, then the result will be that the CLOCK B pulses will be stored in counter IC36 and the CLOCK A pulses will be stored in the counter IC37, with the result that the larger count will be stored in latch IC35 via terminals IB0–IB3, and the smaller count will be stored via terminals IA0–IA3. FIG. 3E shows the use of the port counter values to steer the program flow, cross-connection causing branching at step 19 (FIG. 3B) to steps 19C, 19D wherein the cross-connection LED is enabled and a warning "1" is put into bit 16 of the next command word transmitted. FIG. 4E shows identical branching control according to counter values in the transponder when configured as a slave.

The foregoing principles may be applied to the design of a transponder suitable for use with the aforementioned Sega systems. The necessary modifications will be evident to those of ordinary skill in the art. Thus, for example, the Sega system uses an 8 bit encoder in the controller which outputs responsively to a clocked train of eight pulses. The controller status is represented by combinations of states on four parallel lines, and the associated console has a decoder for receiving these data signals and transforming them into a final 12 bit status word. Such a decoder may be incorporated into the sensing and control circuit SCC2 of FIG. 2, and similar encoders may be used to replace shift registers SR2 and SR3. Signal routing to the output connectors CN2, CN4 may be achieved by direct microprocessor outputting from the sensing and control circuit SCC2, or by means of an array of analog switches responsive to such commands. It will be recalled that irrespective of whether the unit is configured as a master or a slave, the master word is to be sent to shift register SR2, and the slave word to shift register SR3. It will further be recalled that program branching causes the transmitted and received words to be sent to the proper shift registers by branching the program either to the master program or the slave program according to the setting of switch MS. This selectivity may equally well be achieved by use of analog switches directly responsive to the setting of the master-slave switch MS.

It may also be desirable to make provision for voice communication between the operators during the conduct of a game. This may be done in a variety of ways. A special switch on the transponder may be employed to incorporate a cross-connection warning into the next command word transmitted, thereby locking both transponders into the previously discussed abort condition. By agreement between the players, when the cross connection LED is lit, each is to pick up his associated telephone, i.e. move the handset "off-hook". A simple sensing circuit responsive to off-hook condition may be used to silence the associated modem, thereby permitting two-way voice communication. This same sensing may be employed to re-enable the associated modem responsively to emplacement of the telephone in its cradle, and the game may be restarted by means previously discussed. Various other alternatives will be evident to those of ordinary skill in the art, such as special warning flags incorporated into command words, the employment of special interrupts, and other appropriate methods.

The foregoing principles are not restricted to the control of game systems by operators remotely located with respect to each other. Thus, the principles set forth hereinabove may equally well be applied to a variety of systems independently controllable by command or data words originating at two different sources. One transponder could be associated with the actual system, machine or device being operated, and the other could be associated with an emulator informing the remote operator of the current status of the system. These and other similar variants are to be considered as being within the scope of the claims.

It will be understood that the invention may be embodied in other specific forms without departing from the spirit or central characteristics thereof. The present examples and embodiments therefor are to be considered in all respects as illustrative and not restrictive, and the invention is not to be limited to the details given herein.

TABLE III

```
   Copyright 1994 Robert Newberry
   /*************************************************************
   **************/
 5 /* Master Modem/Slave Flow-Chart Program
             */
   /*************************************************************
   **************/
   /*
10                                                             */
   /* C-Code Included Intended To Be Run on 8031 Family of
      */
   /* Microcomputers with Hardware as described in documentation
      */
15 /*************************************************************
   **************/
   #include <reg51.h>        /* define 8051 registers */
   #include <absacc.h> define OUTA 0x8007       /* GAME PLAYER 1-PORT A(Upper Nibble)
20 */
   #define OUTB 0x8006       /* GAME PLAYER 1-PORT B(Lower Nibble)
   */
   #define INA 0x8005        /* JOYSTICK PORT A(Upper Nibble) */
   #define INB 0x8004        /* JOYSTICK PORT B(Upper Nibble) */
25 #define OUTC 0x8003       /* GAME PLAYER 2-PORT A(Upper Nibble)
   */
   #define OUTD 0x8002       /* GAME PLAYER 2-PORT B(Lower Nibble)
   */
   #define CLK 0x8001        /* CLOCK PHASE DETECT PORT */

30 sbit LED_CONF=P1^3;       /* CONFIRMATION LED */
   sbit LED_CROSS=P1^4;      /* CROSS-CONNECTION LED */
   sbit PSENSE=P1^5;         /* Player 1/2 electrical switch */
   sbit PLAYER=P1^6;         /* Player 1/2 routing control */ sbit LOAD=P3^3;           /* Load Line */

35 unsigned char master_count=1,slave_count=1;
   unsigned int register1,register2,buffera,i;
   unsigned char MOD3_CNT,timeout,master;

increment_mod3()
       {
40     if (master)           /* Master MOD3 Counter */
         {
           switch ((register1&24576)<<14)
             {
               case 0: /* Bit14 = 0 , Bit15 = 1 */
45             register1=register1&(~8192);
```

```
                    register1=register1|16384;
                    break;
            case 1: /* Bit14 = 1 , Bit15 = 0 */
                    register1=register1|8192;
                    register1=register1&(~16384);
                    break;
            case 2: /* Bit14 = 1 , Bit15 = 1 */
                    register1=register1|24576;
                    break;
            case 3: /* Bit14 = 0 , Bit15 = 0 */
                    register1=register1&(~24576);
                    break;
            default: break;
         }
      }
       else
      {                    /* Slave MOD3 Counter */
         switch ((register2&24576)<<14)
            {
            case 0: /* Bit14 = 0 , Bit15 = 1 */
                    register2=register2&(~8192);
                    register2=register2|16384;
                    break;
            case 1: /* Bit14 = 1 , Bit15 = 0 */
                    register2=register2|8192;
                    register2=register2&(~16384);
                    break;
            case 2: /* Bit14 = 1 , Bit15 = 1 */
                    register2=register2|24576;
                    break;
            case 3: /* Bit14 = 0 , Bit15 = 0 */
                    register2=register2&(~24576);
                    break;
            default: break;
         }

}
} unsigned char error_free()

{

MOD3_CNT=(buffera&24576)<<14;
    if (master)
      {
        if ((MOD3_CNT==0) || (MOD3_CNT==2))
       return(0);
         else
       return(MOD3_CNT);
      }
    else
```

```
        {
          if ((MOD3_CNT==1) || (MOD3_CNT==3))
        return(0);
          else
        return(MOD3_CNT);
        }

} unsigned char confirm_rcv()

{
      /* Return 1 If Confirmation Flag Is Set */
      if (buffera&4096)
        return(1);
      else
        return(0);
    } unsigned char cross_connect()

{
      /* Return 1 if Cross-Connection Flag Is Set */
      if (buffera&32768)
        return(1);

/* Check Clock Counters, If Clock 1 > Clock 2? */
      if ((XBYTE[CLK]&240)>=((XBYTE[CLK]&15)<<4))
        return(0);
      else
        return(1);
    } unsigned char getword(input_word)
        unsigned int input_word;

{
      /* Receive Two 8 Bit Words Into Input_Word */
      if (RI)
        {
          input_word = SBUF;
          RI = 0;
        }
      else
        return(1);
      i=0;
      while (i<32626)
        {
          if (RI)
            {
              input_word = input_word+(SBUF>>8);
```

```
              RI = 0;
              i=32627;   /* Break Out Of Loop */
            }
          i++;
        }
    if (i==32626) return(255);

/* Normal Two Byte Reception, O.K. */
    return(0);
}
putword(input_word)
    unsigned int input_word;
{

/* Transmit Two Byte Word Over Serial Line */ while (!TI);
    TI = 0;
    SBUF = input_word&255;
    while (!TI);
    TI = 0;
    SBUF = (input_word&240)<<8;

} main()
{
    XBYTE[OUTA]=255;                    /* Clear Joystick Buffers */
    XBYTE[OUTB]=255;
    XBYTE[OUTC]=255;
    XBYTE[OUTD]=255;

SCON = 0x52;          /* SCON register */
              /* setup serial port control */
    TMOD = 0x20;          /* TMOD register */
              /* hardware (2400 BAUD @11.0592MHZ) */
    TCON = 0x69;          /* TCON register */
     TH1 = 0xF4;          /* TH1  register */ master=PSENSE;

if (master)
      {  /* Begin Master Flow Chart */ while (master_count<28)
            {
            switch(master_count)
              {
                case 1:
    /*******************************************/
```

```
            /* Figure 3A - Step 1                        */
            /*<<<<<<<<<<<<<<<<<<<<<<<<>>>>>>>>>>>>>>>>>>>>*/
            /* Register 1: 0 Into Bits 1-12,14-16         */
            /*            : 1 Into Bit 13                 */
              register1=4096;
            /* Clear Register 2,Buffer A                  */
              register2=0;
              buffera=0;
            /* Disable Confirmation LED                   */
              LED_CONF=0;
              /**********************************************/
              break;
                  case 2:
              /**********************************************/
              /* Figure 3A - Step 2                         */
              /*<<<<<<<<<<<<<<<<<<<<<<<<>>>>>>>>>>>>>>>>>>>>*/
              /* Initialize MOD 3 Counter                   */
              /* Register 1: 00 Into Bits 14,15             */
            register1=register1&(~24576);
              /**********************************************/
              break;
                  case 3:
              /**********************************************/
              /* Figure 3A - Step 3                         */
              /*<<<<<<<<<<<<<<<<<<<<<<<<>>>>>>>>>>>>>>>>>>>>*/
              /* Read Master Controller Status Word And     */
              /* Store In Register 1: Bits 1-12             */
            register1=XBYTE[INA]+((XBYTE[INB]>>8)&(~61440));
              /**********************************************/
              break;
                  case 4:
              /**********************************************/
              /* Figure 3A - Step 4                         */
              /*<<<<<<<<<<<<<<<<<<<<<<<<>>>>>>>>>>>>>>>>>>>>*/
              /* Send Out Master Command Word From          */
              /* Register 1                                 */
            putword(register1);
              /**********************************************/
              break;
                  case 5:
              /**********************************************/
              /* Figure 3A - Step 5                         */
              /*<<<<<<<<<<<<<<<<<<<<<<<<>>>>>>>>>>>>>>>>>>>>*/
              /* Is Slave Command Word Received In          */
              /* Buffer A?                                  */
            timeout=getword(buffera);
             if (timeout==0)
               master_count=8;
              /**********************************************/
              break;
                  case 6:
              /**********************************************/
```

```
            /* Figure 3A - Step 6                          */
            /*<<<<<<<<<<<<<<<<<<<<<<<>>>> >>>>>>>>>>>>>>*/
            /* Timeout Yet?                               */
               if (timeout==1)       /* No   /
                 master_count=4;
         else                        /* Yes */
         master_count=6;
            /******************************* *************/
               break;
            case 7:
            /******************************* *************/
            /* Figure 3A - Step 7                          */
            /*<<<<<<<<<<<<<<<<<<<<<<<>>>> >>>>>>>>>>>>>>*/
            /* Disable Confirmation LED                   */
            LED_CONF=0;
            /******************************* *************/
               break;
               case 8:
            /********************************************/
            /* Figure 3A - Step 8                          */
            /*<<<<<<<<<<<<<<<<<<<<<<<>>>>>>>>>>>>>>>>>>>*/
            /* Set Nonconfirmation Flag                   */
            /* Register 1: 0 Into Bit 13                  */
                register1=register1&(~4096);
            master_count=1;
            /********************************************/
               break;
               case 9:
            /********************************************/
            /* Figure 3B - Step 9                          */
            /*<<<<<<<<<<<<<<<<<<<<<<<>>>>>>>>>>>>>>>>>>>*/
            /* Error-Free ?                               */
            if (error_free()==0)     /* Yes */
              master_count=11;
               else                   /* No */
            master_count=9;
            /********************************************/
         break;
               case 10:
            /********************************************/
            /* Figure 3B - Step 10                         */
            /*<<<<<<<<<<<<<<<<<<<<<<<>>>>>>>>>>>>>>>>>>>*/
            /* Set Nonconfirmation Flag                   */
            /* Register 1: 0 Into Bit 13                  */
            register1=register1&(~4096);
            /********************************************/
         break;
               case 11:
            /********************************************/
            /* Figure 3B - Step 11                         */
            /*<<<<<<<<<<<<<<<<<<<<<<<>>>>>>>>>>>>>>>>>>>*/
            /* Disable Confirmation LED                   */
```

```
          LED_CONF=0;
          master_count=1;
     /**********************************************/
          break;
             case 12:
     /**********************************************/
     /* Figure 3B - Step 12                         */
     /*<<<<<<<<<<<<<<<<<<<<<<>>>>>>>>>>>>>>>>>>>>>>*/
     /* Confirmation Received?                      */
     if (confirm_rcv())    /* Yes */
       master_count=15;
     else                  /* No  */
       master_count=12;
     /**********************************************/
     break;
             case 13:
     /**********************************************/
     /* Figure 3B - Step 13                         */
     /*<<<<<<<<<<<<<<<<<<<<<<>>>>>>>>>>>>>>>>>>>>>>*/
     /* Disable Confirmation LED                    */
     LED_CONF=0;
     /**********************************************/
     break;
             case 14:
             case 16:
             case 26:
     /**********************************************/
     /* Figure 3B - Step 14,16,26                   */
     /*<<<<<<<<<<<<<<<<<<<<<<>>>>>>>>>>>>>>>>>>>>>>*/
     /* Increment MOD 3 Counter                     */
     /* Register 1: Bits 14,15                      */
        increment_mod3();
     /**********************************************/
             break;
             case 15:
     /**********************************************/
     /* Figure 3B - Step 15                         */
     /*<<<<<<<<<<<<<<<<<<<<<<>>>>>>>>>>>>>>>>>>>>>>*/
     /* Set Nonconfirmation Flag                    */
     /* Register 1: 0 Into Bit 13                   */
     register1=register1&(~4096);
     master_count=2;
     /**********************************************/
     break;
          case 17:
     /**********************************************/
     /* Figure 3B - Step 17                         */
     /*<<<<<<<<<<<<<<<<<<<<<<>>>>>>>>>>>>>>>>>>>>>>*/
     /* ENABLE Confirmation LED                     */
     LED_CONF=1;
     /**********************************************/
     break;
```

```
        case 18:
        case 19:
/****************************************/
/* Figure 3B - Step 18,25               */
/*<<<<<<<<<<<<<<<<<<<<<<<>>>>>>>>>>>>>>>>*/
/* Set Confirmation Flag                */
/* Register 1: 1 Into Bit 13            */
register1=register1|4096;
/****************************************/
        break;
    case 19:
/****************************************/
/* Figure 3B - Step 19                  */
/*<<<<<<<<<<<<<<<<<<<<<<<>>>>>>>>>>>>>>>>*/
    /* Cross-Connection?                */
if (cross_connect())   /* Yes */
{
    /* 19C: Enable Cross-connection LED */
    LED_CROSS=1;
    /* 19D: Cross-connection warning:   */
    /*      1 Into Register 1 Bit 16    */
    register1=register1|32768;
    master_count=2;
}
 else                   /* No   */
   {
    /* 19A: Disable Cross-connection LED */
    LED_CROSS=0;
    /* 19B: Cross-connection absent:    */
    /*      0 Into Register 1 Bit 16    */
    register1=register1&(~32768);
    master_count=19;
}
/****************************************/
            break;
        case 20:
/****************************************/
/* Figure 3C - Step 20                  */
/*<<<<<<<<<<<<<<<<<<<<<<<>>>>>>>>>>>>>>>>*/
    /* Register 2 Empty?                */
if (register2)
   master_count=21;  /* No */
else
   master_count=20;  /* Yes */
/****************************************/
break;
        case 21:
/****************************************/
/* Figure 3C - Step 21                  */
/*<<<<<<<<<<<<<<<<<<<<<<<>>>>>>>>>>>>>>>>*/
    /* Move Buffer A Into Register 2    */
register2=buffera;
```

```
            master_count=24;
        /************************* **************/
        break;
            case 22:
        /************************** *****************/
        /* Figure 3C - Step 22                      */
        /*<<<<<<<<<<<<<<<<<<<<<<<<<>>>>>>>>>>>>>>>>>>>*/
        /* Write Register 1 (Bits 1-12) To         */
        /* Console Port 1                           */
        XBYTE[OUTB]=register1&255; /* Lower 8 Bits */
                                   /* Upper 8 Bits */
        XBYTE[OUTA]=((register1&3840)<<8)+240;
        /**********************************************/
         break;
            case 23:
        /******************************* ************/
        /* Figure 3C - Step 23                      */
        /*<<<<<<<<<<<<<<<<<<<<<<<<<>>>>>>>>>>>>>>>>>>>*/
        /* Move Buffer A Into Register 2            */
        register2=buffera;
        /**********************************************/
        break;
            case 24:
        /**********************************************/
        /* Figure 3C - Step 24                      */
        /*<<<<<<<<<<<<<<<<<<<<<<<<<>>>>>>>>>>>>>>>>>>>*/
        /* Write Register 2 (Bits 1-12) To         */
        /* Console Port 2                           */
        XBYTE[OUTD]=register2&255; /* Lower 8 Bits */
                                   /* Upper 8 Bits */
           XBYTE[OUTC]=((register2&3840)<<8)+240;
        master_count=24;
        /**********************************************/
          break;

case 27:
        /**********************************************/
        /* Figure 3B - Step 27                      */
        /*<<<<<<<<<<<<<<<<<<<<<<<<<>>>>>>>>>>>>>>>>>>>*/
        /* ENABLE Confirmation LED                  */
           LED_CONF=1;
        master_count=2;
        /**********************************************/
        break;

default: break;
          } /* End Switch */ master_count++;

} /* End While */
    } /* End Master Flow Chart */
```

```
              else
                 {  /* Begin Slave Flow Chart */
              while (slave_count<28)
                  {
                  switch(slave_count)
                     {
                         case 1:
                  /************************************/
                     /* Figure 4A - Step 1              */
                  /*<<<<<<<<<<<<<<<<<<<<<>>>>>>>>>>>>>>>>>>>*/
                     /* Register 2: 0 Into Bits 1-12,14-16   */
                     /*           : 1 Into Bit 13            */
                  register2=4096;
                     /* Clear Register 2,Buffer A            */
                  register1=0;
                  buffera=0;
                     /* Disable Confirmation LED             */
                  LED_CONF=0;
                  /************************************/
                  break;
                         case 2:
                  /************************************/
                     /* Figure 4A - Step 2              */
                  /*<<<<<<<<<<<<<<<<<<<<<>>>>>>>>>>>>>>>>>>>*/
                     /* Initialize MOD 3 Counter        */
                     /* Register 2: 01 Into Bits 14,15  */
                  register2=register2&(~8192);
                  register2=register2|16384;
                  /************************************/
                  break;
                         case 3:
                  /************************************/
                     /* Figure 4A - Step 3              */
                  /*<<<<<<<<<<<<<<<<<<<<<>>>>>>>>>>>>>>>>>>>*/
                     /* Read Master Controller Status Word And */
                     /* Store In Register 2: Bits 1-12          */
                  register2=XBYTE[INA]+((XBYTE[INB]>>8)&(~61440));
                  /************************************/
                  break;
                         case 4:
                  /************************************/
                     /* Figure 4A - Step 4              */
                  /*<<<<<<<<<<<<<<<<<<<<<>>>>>>>>>>>>>>>>>>>*/
                     /* Is Slave Command Word Received In */
                     /* Buffer A?                          */
                  timeout=getword(buffera);
                  if (timeout==0)
                    slave_count=7;
                  /************************************/
                  break;
```

```
        case 5:
/***********************************/
/* Figure 4A - Step 5              */
/*<<<<<<<<<<<<<<<<<<<<<>>>>>>>>>>>>>>>>>>>>>*/
/* Timeout Yet?                    */
if (timeout==1)       /* No */
  slave_count=3;
else                  /* Yes */
  slave_count=5;
/***********************************/
break;
        case 6:
        case 17:
/***********************************/
/* Figure 4A - Step 6,17           */
/*<<<<<<<<<<<<<<<<<<<<<>>>>>>>>>>>>>>>>>>>>>*/
/* Disable Confirmation LED        */
LED_CONF=0;
/***********************************/
break;
        case 7:
/***********************************/
/* Figure 4A - Step 7              */
/*<<<<<<<<<<<<<<<<<<<<<>>>>>>>>>>>>>>>>>>>>>*/
/* Set Nonconfirmation Flag        */
/* Register 2: 0 Into Bit 13       */
register2=register2&(~4096);
slave_count=1;
/***********************************/
break;
        case 8:
/***********************************/
/* Figure 4B - Step 8              */
/*<<<<<<<<<<<<<<<<<<<<<>>>>>>>>>>>>>>>>>>>>>*/
/* Error-Free ?                    */
if (error_free()==0)
  slave_count=8;          /* Yes */
else
  slave_count=15;         /* No */
/***********************************/
break;

case 9:
        case 25:
/***********************************/
/* Figure 4B - Step 9,25           */
/*<<<<<<<<<<<<<<<<<<<<<>>>>>>>>>>>>>>>>>>>>>*/
/* Increment MOD 3 Counter         */
/* Register 2: Bits 14,15          */
increment_mod3();
/***********************************/
break;
```

```
        case 10:
/**********************************************/
/* Figure 4B - Step 10                        */
/*<<<<<<<<<<<<<<<<<<<<<<<>>>>>>>>>>>>>>>>>>>>*/
/* Confirmation Received?                     */
if (confirm_rcv())
   slave_count=10;   /* Yes */
else
   slave_count=16;   /* No */
/**********************************************/
break;
        case 11:
        case 24:
/**********************************************/
/* Figure 4B - Step 11,24                     */
/*<<<<<<<<<<<<<<<<<<<<<<<>>>>>>>>>>>>>>>>>>>>*/
/* Set Confirmation Flag                      */
/* Register 2: 1 Into Bit 13                  */
register2=register2|4096;
/**********************************************/
break;
        case 12:
        case 26:
/**********************************************/
/* Figure 4A - Step 12                        */
/*<<<<<<<<<<<<<<<<<<<<<<<>>>>>>>>>>>>>>>>>>>>*/
/* Enable  Confirmation LED                   */
LED_CONF=0;
/**********************************************/
break;
        case 13:
/**********************************************/
/* Figure 4B - Step 13                        */
/*<<<<<<<<<<<<<<<<<<<<<<<>>>>>>>>>>>>>>>>>>>>*/
/* Cross-Connection?                          */
if (cross_connect())   /* Yes */
   {
   /* 14: Enable Cross-connection LED */
LED_CROSS=1;
/* 15: Cross-connection warning:    */
/*      1 Into Register 2 Bit 16    */
register2=register2|32768;
slave_count=26;
   }
   else                 /* No   */
   {
   /* 18A: Disable Cross-connection LED */
LED_CROSS=0;
/* 18B: Cross-connection absent:    */
/*      0 Into Register 2 Bit 16    */
register2=register2&(~32768);
slave_count=18;
```

```
        }
/*********************************/
    break;
        case 18:
/*********************************/
/* Figure 4B - Step 18                      */
/*<<<<<<<<<<<<<<<<<<<<<<<<<>>>>>>>>>>>>>>>>>>>>>>>>>*/
/* Set Nonconfirmation Flag                 */
/* Register 0: 1 Into Bit 13                */
    register2=register2&(~4096);
slave_count=26;
/*********************************/
break;

case 19:
/*********************************/
/* Figure 4C - Step 19                      */
/*<<<<<<<<<<<<<<<<<<<<<<<<<>>>>>>>>>>>>>>>>>>>>>>>>>*/
/* Register 1 Empty?                        */
if (register1)
  slave_count=20;   /* No */
else
  slave_count=19;   /* Yes */
/*********************************/
break;
        case 20:
/*********************************/
/* Figure 4C - Step 20                      */
/*<<<<<<<<<<<<<<<<<<<<<<<<<>>>>>>>>>>>>>>>>>>>>>>>>>*/
/* Move Buffer A Into Register 1            */
register1=buffera;
slave_count=23;
/*********************************/
break;
        case 21:
/*********************************/
/* Figure 4C - Step 21                      */
/*<<<<<<<<<<<<<<<<<<<<<<<<<>>>>>>>>>>>>>>>>>>>>>>>>>*/
/* Write Register 2 (Bits 1-12) To          */
/* Console Port 2                           */
XBYTE[OUTD]=register2&255; /* Lower 8 Bits */
                           /* Upper 8 Bits */
    XBYTE[OUTC]=((register2&3840)<<8)+240;
/*********************************/
break;
        case 22:
/*********************************/
/* Figure 4C - Step 22                      */
/*<<<<<<<<<<<<<<<<<<<<<<<<<>>>>>>>>>>>>>>>>>>>>>>>>>*/
/* Move Buffer A Into Register 1            */
register1=buffera;
/*********************************/
```

```
              break;
                  case 23:
              /*******************************************/
              /* Figure 4C - Step 23                     */
     5        /*<<<<<<<<<<<<<<<<<<<<<<<<>>>>>>>>>>>>>>>>>*/
              /* Write Register 1 (Bits 1-12) To         */
              /* Console Port 1                          */
              XBYTE[OUTB]=register2&255; /* Lower 8 Bits */
                                         /* Upper 8 Bits */
    10           XBYTE[OUTA]=((register2&3840)<<8)+240;
              slave_count=23;
                  /*******************************************/
              break;
                  case 27:
    15        /*******************************************/
              /* Figure 4D - Step 27                     */
              /*<<<<<<<<<<<<<<<<<<<<<<<<>>>>>>>>>>>>>>>>>*/
              /* Send Out Slave Command Word From        */
              /* Register 2                              */
    20        putword(register2);
              slave_count=2;
                  /*******************************************/
              break;

} /* End Switch */

25       slave_count++;

} /* End While */
          }  /* End Slave Flow Chart */

} /* End Program */
```

TABLE IV

| DEVICE NO. | DEVICE TYPE |
| --- | --- |
| IC3 | 4050 |
| IC7 | 74HCT04 |
| IC8 | 74HCT04 |
| IC9 | 74HC245 |
| IC10 | 74HC373 |
| IC11 | 27C64 EPROM |
| IC14 | 74HC244 |
| IC16 | 74HC244 |
| IC17 | 74HCT274 |
| IC18 | 74HCT374 |
| IC19 | 74HCT274 |
| IC20 | 74HCT274 |
| IC21 | 4021 |
| IC22 | 4021 |
| IC23 | 74HCT164 |
| IC24 | 74HCT164 |
| IC27 | 74HCT374 |
| IC28 | 4021 |
| IC29 | 74HCT374 |
| IC30 | 74HCT374 |
| IC35 | 74HCT244 |
| IC36 | 74HC193 |
| IC37 | 74HC193 |

I claim:

1. A transponder comprising:

first and second transponder output port means for outputting binary data words to an associated system;

transponder input port means for receiving binary data words supplied thereto;

communication port means adapted for connection to a two-way communication system for transmitting and receiving binary command words; and a transponder control system including:

first memory storage means for storing the last data word received at said transponder input port means, command word generating means for forming command words having a status portion containing a replica of the contents of said first memory storage means and a control portion including an error detection code and a confirmation code having a first configuration indicative of error-free reception of a command word at said communication port means and a second configuration indicative of transmission error in said received command word, said generating means including first output means for outputting via said communication port means a command word so formed responsively to receipt of a command word at said communication port means, second memory storage means for storing a replica of the status portion of the last word outputted via said communication port means, third memory storage means for storing a replica of the status portion of a command word received in reply to said outputted command word, transfer means for providing said replicas to said second and third memory storage means, second and third output means for outputting via said first and second transponder output port means replicas of the contents of said second and third memory storage means respectively responsively to receipt of demand signal conditions at said first and second transponder output port means respectively, and disabling means for disabling said transfer means responsively to receipt of either one of an error-indicating condition and a confirmation code having said second configuration in said command word received in reply.

2. The transponder of claim 1 wherein said second and third storage means each includes a latch connected to load a shift register operable to a serial unloading condition by receipt of said loading pulse and to unload the contents of said shift register responsively to receipt of a pulse train, said latches being configured to restore the contents of their associated shift registers after unloading.

3. A transponder comprising:

first and second transponder output port means for outputting binary data words to an associated system;

transponder input port means for receiving binary data words supplied thereto;

communication port means adapted for connection to a two-way communication system for transmitting and receiving binary command words; and a transponder control system including:

first memory storage means for storing the last data word received at said transponder input port means, command word generating means for forming command words having a status portion containing a replica of the contents of said first memory storage means and a control portion including an error detection code and a confirmation code having a first configuration indicative of error-free reception of a command word at said communication port means and a second configuration indicative of transmission error in said received command word, said generating means including first output means for outputting via said communication port means a command word so formed responsively to receipt of a command word at said communication port means, second memory storage means for storing a replica of the status portion of the last word outputted via said communication port means, third memory storage means for storing a replica of the status portion of a command word received in reply to said outputted command word, transfer means for providing said replicas to said second and third memory storage means, second and third output means for outputting via said first and second transponder output port means replicas of the contents of said second and third memory storage means respectively responsively to receipt of demand signal conditions at said first and second transponder output port means respectively, and disabling means for disabling said transfer means responsively to receipt of either one of an error-indicating condition and a confirmation code having said second configuration in said command word received in reply, and wherein said command word generating means includes means for automatically outputting a command word if no command word is received at said communication port means within a given time.

4. The transponder of claim 1 wherein said communication port means includes a modem.

5. A transponder for use with an action video game playing system having a computer controlled game console including first and second console input port means for receiving binary status words derived from a pair of user-operable controllers each having at least one user-operable control element operable to at least two status conditions and means responsive to said status conditions for producing binary status words representing said status conditions, each controller having controller output port means adapted for connection to a different one of said console input port means and including means responsive to receipt of demand signal conditions from said console input port means for transferring to said console said status words, said transponder comprising:

first and second transponder output port means for connection to said console first and second input port means;

transponder input port means for connection to the output port means of one such controller;

communication port means adapted for connection to a two-way communication system for transmitting and receiving command words to and from a similarly configured remote game playing system; and a transponder control system including:

interrogating means for periodically providing said demand signal conditions at said transponder input port means and including first memory storage means for storing the last status word received therefrom, command word generating means for forming command words having a status portion containing a replica of the contents of said first memory storage means and a control portion including an error detection code and a confirmation code having a first configuration indicative of error-free reception of a command word at said communication port means and a second configuration indicative of transmission error in said received command word, said generating means including first output means for outputting via said communication port means a command word so formed responsively to receipt of a command word at said communication port means, second memory storage means for storing a replica of the status portion of the last word outputted via said communication port means, third memory storage means for storing a replica of the status portion of a command word received in reply to said outputted command word, transfer means for providing said replicas to said second and third memory storage means, second and third output means for outputting via said first and second transponder output port means replicas of the contents of said second and third memory storage means respectively responsively to receipt of said demand signal conditions at said first and second transponder output port means respectively, and disabling means for disabling said transfer means responsively to receipt of either one of an error-indicating condition and a confirmation code having said second configuration in said command word received in reply.

6. The transponder of claim 5 wherein said communication port means includes a modem.

7. The transponder of claim 5 wherein said interrogation means includes connection means for interconnecting said transponder input port means to one of said first and second transponder output port means so that said demand signal conditions are conveyed from said one of said first and second transponder output port means to said transponder input port means.

8. The transponder of claim 5 for use with a console producing said demand signal conditions to include first and second pulse trains at said first and second console input port means, said pulse trains beginning at different times and overlapping in time, said transponder control system including detection means for determining which of said pulse trains begins first, said command word generating means including means for incorporating a cross-connection warning code into said control portion responsively to detection of a given one of said pulse trains beginning before the other.

9. The transponder of claim 8 wherein said disabling means includes means responsive to receipt of a command word containing said cross-connection warning code for disabling said transfer means.

10. The transponder of claim 8 wherein said disabling means includes means responsive to said detection means for disabling said transfer means responsively to said detection of said given one of said pulse trains beginning before the other.

11. The transponder of claim 8 wherein said detection means includes first and second counting means for counting the number of pulses in said pulse trains arriving after a fiducial time beginning before the beginning of said trains and ending before the disappearance of said trains and means for detection whether said given one of said trains began first by comparison of the counts in said counting means.

12. The transponder of claim 5 for use with a console producing said demand signal conditions to include first and second pulse trains at said first and second console input port means, each said pulse train being preceded by a loading pulse, said second and third storage means each including a latch connected to load a shift register operable to a serial unloading condition by receipt of said loading pulse and to unload the contents of said shift register responsively to receipt of one of said pulse trains, said latches being configured to restore the contents of their associated shift registers after unloading.

13. The transponder of claim 5 wherein said control system includes means for receiving a command word and outputting a reply command word at said communication port means in less that 33 milliseconds.

14. The transponder of claim 13 wherein said control system includes means for configuring said reply command words as 16 bit words and includes means for outputting said reply command words at said communication port means at a rate of 2400 baud.

15. A transponder for use with an action video game playing system having a computer controlled game console including first and second console input port means for receiving binary status words derived from a pair of user-operable controllers each having at least one user-operable control element operable to at least two status conditions and means responsive to said status conditions for producing binary status words representing said status conditions, each controller having controller output port means adapted for connection to a different one of said console input port means and including means responsive to receipt of demand signal conditions from said console input port means for transferring to said console said status words, said transponder comprising:

first and second transponder output port means for connection to said console first and second input port means;

transponder input port means for connection to the output port means of one such controller;

communication port means adapted for connection to a two-way communication system for transmitting and receiving command words to and from a similarly configured remote game playing system; and a transponder control system including:

interrogating means for periodically providing said demand signal conditions at said transponder input port means and including first memory storage means for storing the last status word received therefrom, command word generating means for forming command words having a status portion containing a replica of the contents of said first memory storage means and a control portion including an error detection code and a confirmation code having a first configuration indicative of error-free reception of a command word at said communication port means and a second configuration indicative of transmission error in said received command word, said generating means including first output means for outputting via said communication port means a command word so formed responsively to receipt of a command word at said communication port means, second memory storage means for storing a replica of the status portion of the last word outputted via said communication port means, third memory storage means for storing a replica of the status portion of a command word received in reply to said outputted command word, transfer means for providing said replicas to said second and third memory storage means, second and third output means for outputting via said first and second transponder output port means replicas of the contents of said second and third memory storage means respectively responsively to receipt of said demand signal conditions at said first and second transponder output port means respectively, and disabling means for disabling said transfer means responsively to receipt of either one of an error-indicating condition and a confirmation code having said second configuration in said command word received in reply, and wherein said command word generating means includes means for automatically outputting a command word if no command word is received at said communication port means within a given time.

* * * * *